(12) United States Patent
Hayashi et al.

(10) Patent No.: US 10,951,152 B2
(45) Date of Patent: Mar. 16, 2021

(54) POWER CONVERSION APPARATUS

(71) Applicant: DAIKIN INDUSTRIES, LTD., Osaka (JP)

(72) Inventors: Nobuo Hayashi, Osaka (JP); Takurou Ogawa, Osaka (JP); Daisuke Ueki, Osaka (JP); Morimitsu Sekimoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/021,048

(22) Filed: Sep. 15, 2020

(65) Prior Publication Data

US 2020/0412292 A1     Dec. 31, 2020

Related U.S. Application Data

(63) Continuation of application No. PCT/JP2019/005056, filed on Feb. 13, 2019.

(30) Foreign Application Priority Data

Mar. 29, 2018    (JP) .............................. JP2018-064401

(51) Int. Cl.
    *H02M 5/458*      (2006.01)
    *H02P 27/08*      (2006.01)
    *H02M 1/14*       (2006.01)

(52) U.S. Cl.
    CPC ............ *H02P 27/08* (2013.01); *H02M 1/143* (2013.01); *H02M 5/458* (2013.01); *H02P 2201/01* (2013.01)

(58) Field of Classification Search
    CPC .... H02M 5/4585; H02M 1/143; H02M 7/217; H02M 5/458
    See application file for complete search history.

(56) References Cited

U.S. PATENT DOCUMENTS 6,690,137 B2 *   2/2004   Iwaji .................. H02P 6/18
                                                                 318/430
8,098,035 B2 *   1/2012   Sekimoto ............ H02P 23/30
                                                                 318/432

(Continued)

FOREIGN PATENT DOCUMENTS

EP      2 667 501 A1    11/2013
JP       4192979 B2     12/2008

(Continued)

OTHER PUBLICATIONS

International Search Report, issued in PCT/JP2019/005056, dated Apr. 9, 2019.

(Continued)

*Primary Examiner* — Thai T Dinh
(74) *Attorney, Agent, or Firm* — Birch, Stewart, Kolasch & Birch, LLP

(57) ABSTRACT

In order to suppress vibration with a motor a load torque of which periodically fluctuates, an output torque of the motor is controlled to be periodically changed. In this case, in order to increase a vibration suppressing component by a direct power conversion apparatus, at least one of first control and second control is performed. In the first control, an output torque having a waveform including a fundamental frequency component of the load torque a fundamental frequency of which is a frequency in accordance with a fluctuation period of the load torque and at least one of a fourth harmonic and a sixth harmonic of a power source frequency of an AC power source is generated. In the second control, the output torque having a waveform including at least one of a second harmonic and a third harmonic of the fundamental frequency of the load torque and a second harmonic of the power source frequency of the AC power source is generated.

9 Claims, 20 Drawing Sheets

(56) References Cited

U.S. PATENT DOCUMENTS

| | | | | |
|---|---|---|---|---|
| 9,018,870 | B2* | 4/2015 | Kobayashi | B60W 20/00 |
| | | | | 318/400.02 |
| 9,479,103 | B2* | 10/2016 | Verhulst | F25J 1/0284 |
| 10,270,380 | B2 | 4/2019 | Uemura et al. | |
| 10,439,542 | B2* | 10/2019 | Taniguchi | H02M 7/5395 |
| 10,811,997 | B2* | 10/2020 | Hayashi | H02M 5/4585 |
| 2009/0251086 | A1 | 10/2009 | Sekimoto et al. | |
| 2013/0214717 | A1 | 8/2013 | Ishikawa et al. | |
| 2014/0254217 | A1 | 9/2014 | Li et al. | |
| 2016/0294300 | A1 | 10/2016 | Sakakibara et al. | |

FOREIGN PATENT DOCUMENTS

| | | |
|---|---|---|
| JP | 2010-98854 A | 4/2010 |
| JP | 2012-165631 A | 8/2012 |
| JP | 2015-73372 A | 4/2015 |
| WO | WO 2012/060357 A1 | 5/2012 |
| WO | WO 20151041111 A | 3/2015 |
| WO | WO 2017/037945 A1 | 3/2017 |

OTHER PUBLICATIONS

International Preliminary Report on Patentability and English translation of the Written Opinion of the International Searching Authority, dated Oct. 8, 2020, for International Application No. PCT/JP2019/005056.

* cited by examiner

FIG.16
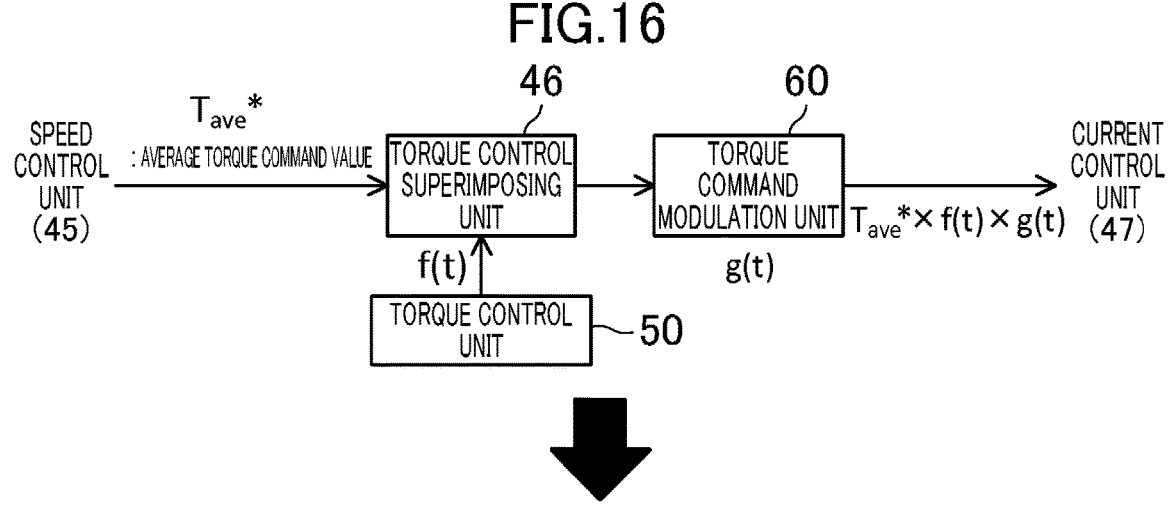
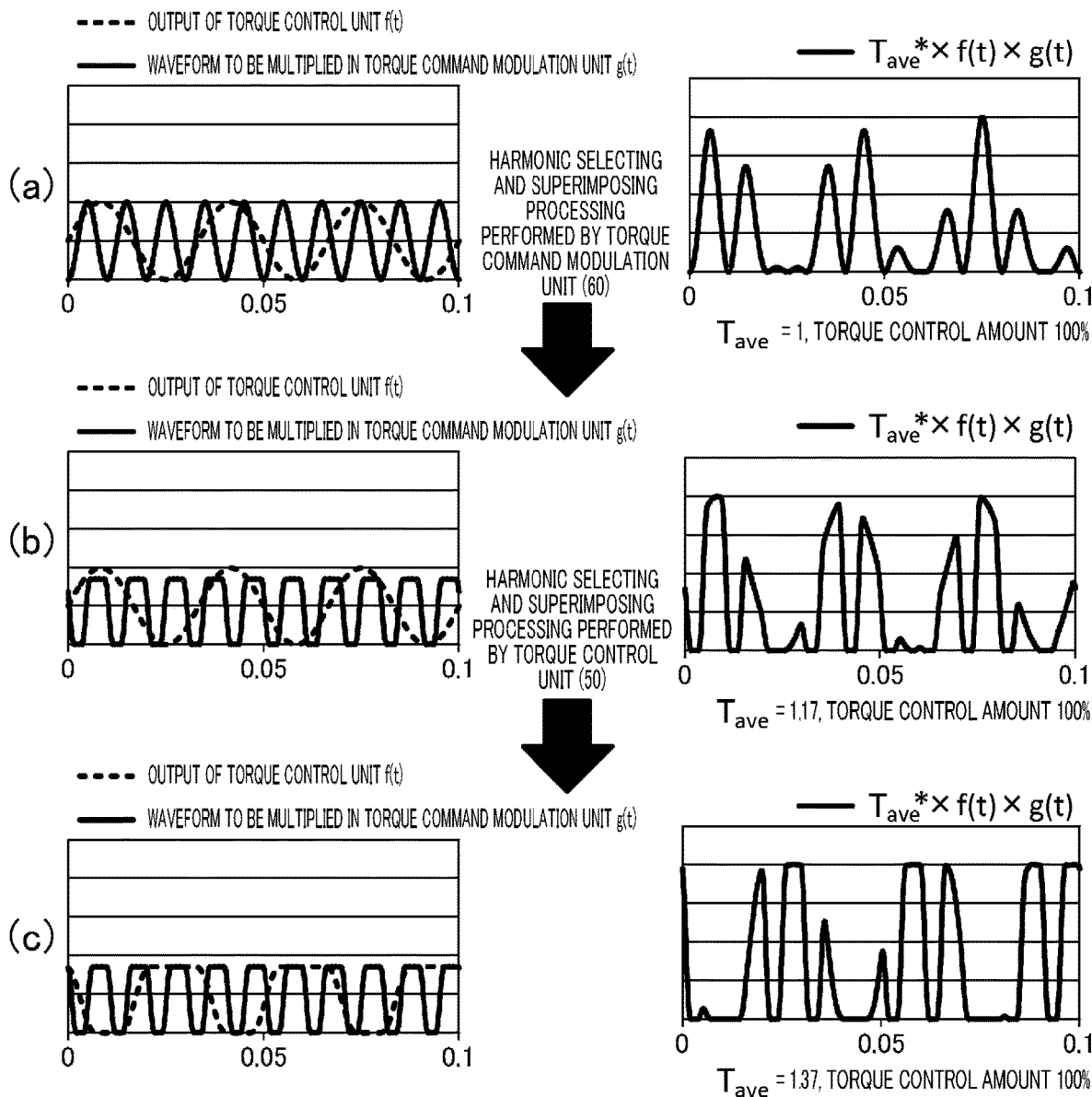

FIG.20
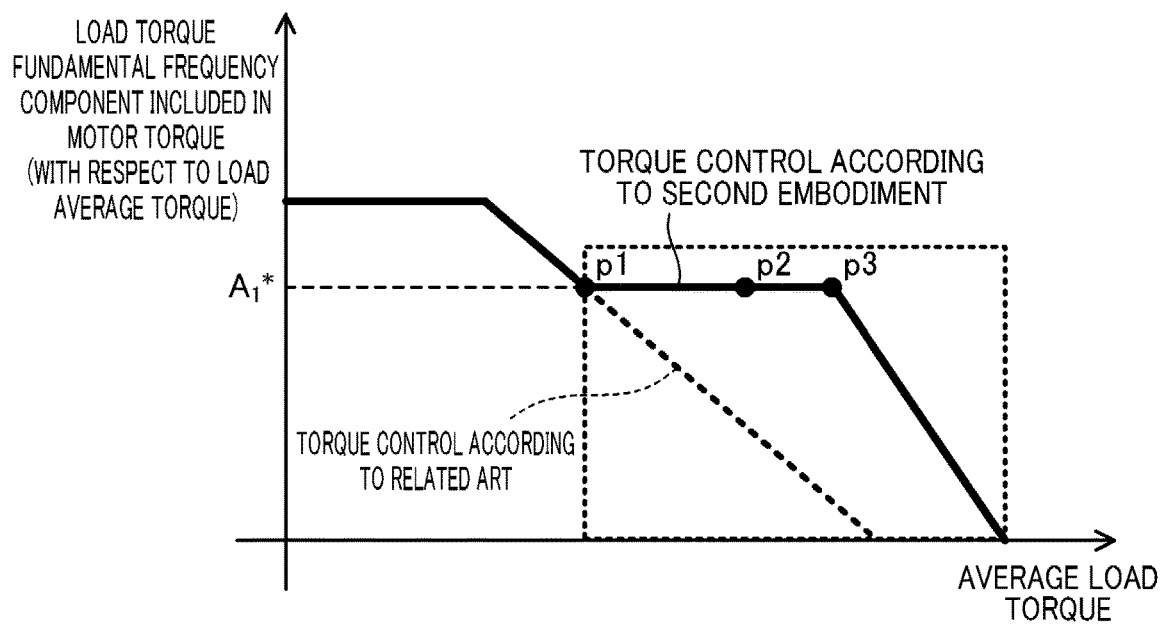
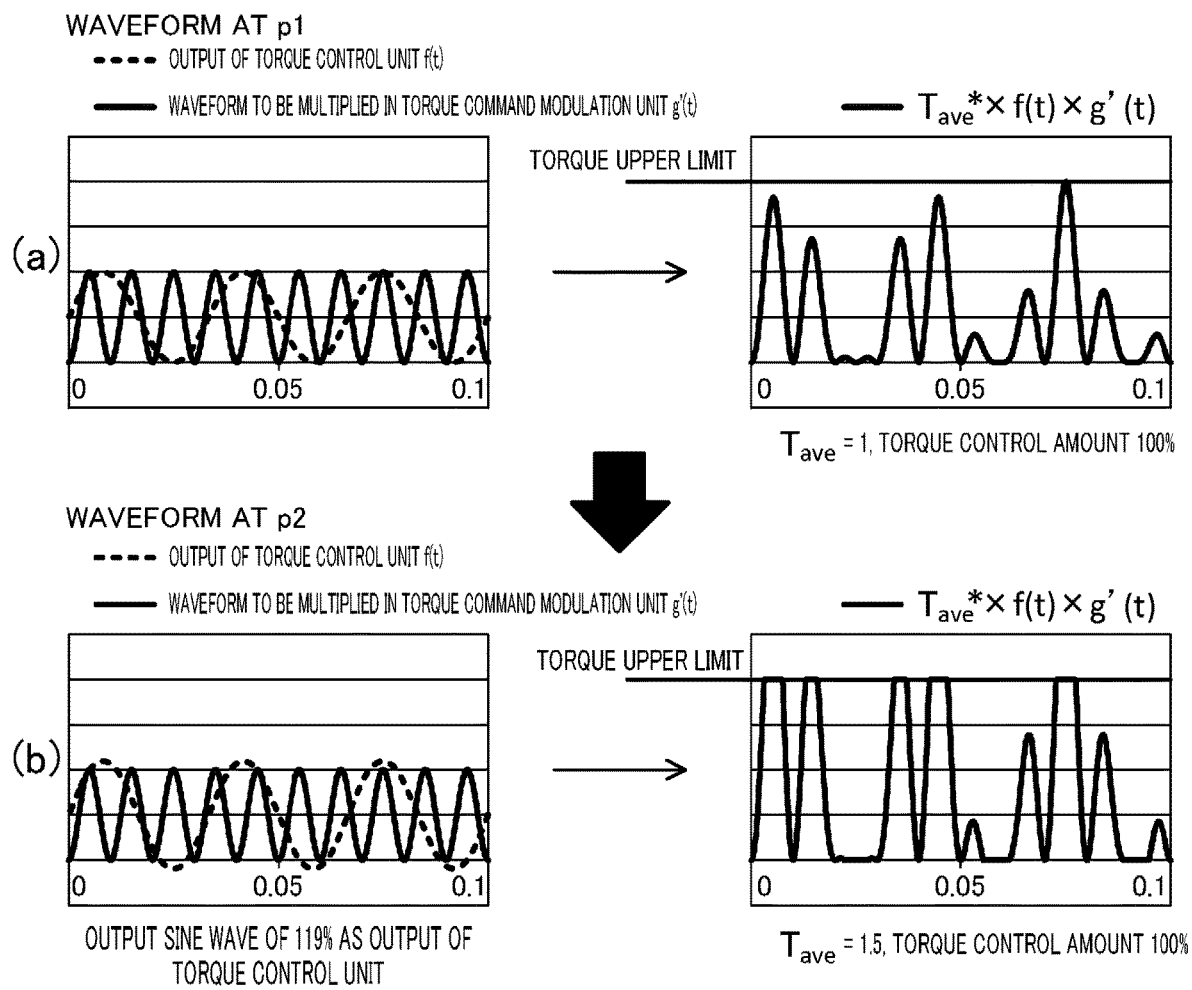

POWER CONVERSION APPARATUS

CROSS REFERENCE TO RELATED APPLICATIONS

This application is a Continuation of PCT International Application No. PCT/JP2019/005056, filed on Feb. 13, 2019, which claims priority under 35 U.S.C. 119(a) to Patent Application No. 2018-064401, filed in Japan on Mar. 29, 2018, all of which are hereby expressly incorporated by reference into the present application.

TECHNICAL FIELD

The present disclosure relates to a power conversion apparatus.

BACKGROUND ART

A power conversion apparatus that converts an alternating current (AC) to a given AC can be classified into two types: an indirect power conversion apparatus and a direct power conversion apparatus. The former includes an energy accumulating element (a large-capacity capacitor or a large-capacity inductor), whereas the latter does not. Thus, an output power of a single-phase direct power conversion apparatus has ripple at a frequency that is twice a power source frequency. As one of configurations classified as a direct power conversion apparatus, there is a configuration in which a comparatively small-capacity capacitor in a direct current (DC) link unit is provided. With the comparatively small-capacity capacitor, a DC voltage includes ripple components having a frequency that is twice the power source frequency, and an output of the power conversion apparatus also has ripple similarly.

PTL 1 discloses a torque control technique for suppressing vibration with the DC voltage in a case where a load torque has ripple periodically. In PTL 1, a ripple component of fluctuation of a load torque of a motor and a ripple component of a DC voltage of a DC link unit are superimposed on an output torque of the motor to perform a torque control operation.

CITATION LIST

Patent Literature

PTL 1: Japanese Patent No. 4192979

SUMMARY

A first aspect of the present disclosure is a direct power conversion apparatus including: a converting unit (13) that includes a plurality of switching elements (Su, Sv, Sw, Sx, Sy, Sz) and that converts an AC power supplied from a single-phase AC power source (6) to a three-phase AC power at a predetermined frequency and supplies the three-phase AC power to a motor (5) a load torque of which periodically fluctuates; and a control unit (40) that controls switching operations of the switching elements (Su, Sv, Sw, Sx, Sy, Sz). The control unit (40) performs at least one of first control and second control, the first control being control for generating an output torque of the motor (5) having a waveform including a fundamental frequency component of the load torque a fundamental frequency of which is a frequency in accordance with a fluctuation period of the load torque and at least one of a fourth harmonic and a sixth harmonic of a power source frequency of the AC power source (6), the second control being control for generating the output torque having a waveform including at least one of a second harmonic and a third harmonic of the fundamental frequency of the load torque and a second harmonic of the power source frequency of the AC power source (6).

BRIEF DESCRIPTION OF THE DRAWINGS

FIG. 16 illustrates operations of the control unit according to the first embodiment.

FIG. 20 illustrates effects of the harmonic selecting and superimposing processing according to the second embodiment.

DESCRIPTION OF EMBODIMENTS

First Embodiment

<Outline>

Figure 1:
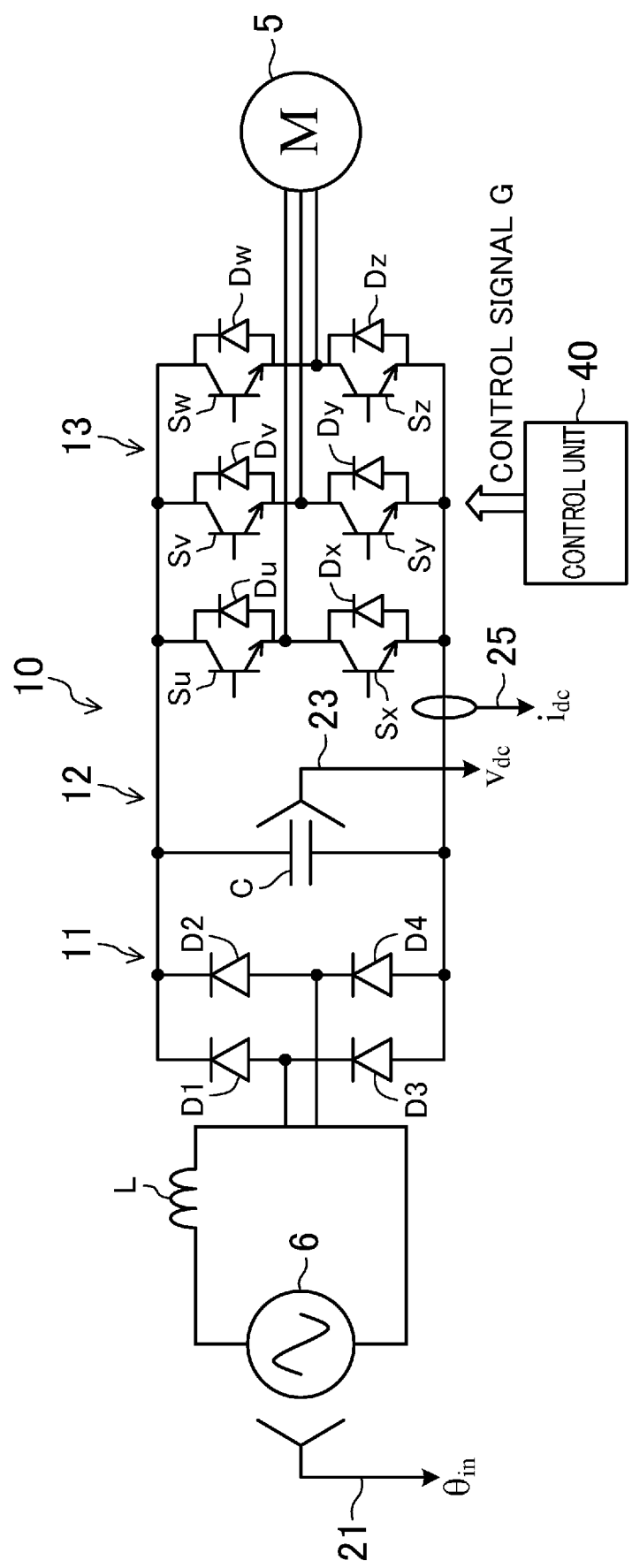
FIG. 1 is a circuit diagram illustrating a configuration of a power conversion apparatus.

As illustrated in FIG. 1, a power conversion apparatus (10) is connected to a single-phase AC power source (6) and, for example, a three-phase AC motor (5) in a compressor in a refrigerant circuit of an air conditioning apparatus. The power conversion apparatus (10) is a so-called direct power conversion apparatus. When an AC power is supplied from the AC power source (6), the power conversion apparatus (10) converts the AC power to a three-phase AC power having a predetermined voltage and a predetermined frequency and outputs the three-phase AC power to the motor (5). Thus, the motor (5) is rotatively driven, and the compressor is operated.

The type of the motor (5) is not limited to a particular type, and for example, the motor (5) may be an interior permanent magnet motor (IPM motor).

The compressor, which is a load apparatus for the motor (5), is constituted by a rotary compressor, for example. In the compressor, with a single rotation of a drive shaft, a compression torque (i.e., a load torque of the motor (5)) has ripple, and thereby vibration occurs.

Accordingly, the power conversion apparatus (10) according to the first embodiment has a control configuration in which the torque of the motor (5) fluctuates so as to suppress the vibration of the compressor.

<Configuration of Power Conversion Apparatus>

As illustrated in FIG. 1, the power conversion apparatus (10) includes a converter circuit (11), a DC link unit (12), an inverter circuit (13), and a control unit (40).

The converter circuit (11) is connected to the single-phase AC power source (6) through a reactor (L). The converter circuit (11) is constituted by a so-called diode bridge circuit in which four diodes (D1, D2, D3, D4) are wired in a bridge configuration. The converter circuit (11) performs full-wave rectification on a power source voltage (Vin) in the AC power from the AC power source (6).

The DC link unit (12) includes a capacitor (C) that is connected in parallel to an output of the converter circuit (11) by being connected between a pair of output nodes of the converter circuit (11). The DC link unit (12) receives the output of the converter circuit (11) (i.e., the full-wave rectified power source voltage (Vin)) and generates a DC link voltage (Vdc) (corresponding to a DC voltage). The DC link voltage (Vdc) have ripple in accordance with the frequency of the power source voltage (Vin).

Now, reasons why the DC link voltage (Vdc) includes a ripple component in accordance with the frequency of the power source voltage (Vin) will be described. The capacitance value of the capacitor (C) of the DC link unit (12) is set such that the output of the converter circuit (11) is hardly smoothed, but a ripple voltage (voltage fluctuation in accordance with a switching frequency) resulting from switching operations (described later) of the inverter circuit (13) can be suppressed. Specifically, in a typical power conversion apparatus, the capacitor (C) is constituted by a small-capacity capacitor (e.g., a film capacitor) having a capacitance value (e.g., about several tens µF) that is about 0.01 times the capacitance value of a smoothing capacitor (e.g., an electrolytic capacitor) used for smoothing an output of a converter circuit.

Since the capacitor (C) is constituted to have a comparatively small capacity in this manner, the output of the converter circuit (11) is hardly smoothed in the DC link unit (12). As a result, a ripple component in accordance with the frequency of the power source voltage (Vin) (in this example, a ripple component having a frequency that is twice the frequency of the DC link voltage (Vdc)) remains in the DC link voltage (Vdc). For example, the DC link voltage (Vdc) has ripple such that the maximum thereof becomes twice or more the minimum thereof.

The inverter circuit (13) is a converting unit. The inverter circuit (13) has a pair of input nodes connected to both ends of the capacitor (C) in the DC link unit (12) and converts the DC link voltage (Vdc) generated by the DC link unit (12) into a three-phase AC power through switching operations and supplies the three-phase AC power to the motor (5). The inverter circuit (13) includes six switching elements (Su, Sv, Sw, Sx, Sy, Sz) and six reflux diodes (Du, Dv, Dw, Dx, Dy, Dz) wired in a bridge configuration. Specifically, the inverter circuit (13) includes three switching legs each formed by connecting two switching elements in series to each other. In each of the three switching legs, a midpoint between an upper-arm switching element (Su, Sv, Sw) and a lower-arm switching element (Sx, Sy, Sz) is connected to a coil of a corresponding phase (coil of U phase, V phase, W phase) of the motor (5). The six reflux diodes (Du, Dv, Dw, Dx, Dy, Dz) are connected to the six switching elements (Su, Sv, Sw, Sx, Sy, Sz) in antiparallel, respectively. These switching elements (Su, Sv, Sw, Sx, Sy, Sz) are repeatedly turned on and off, and thereby the DC link voltage (Vdc) input from the DC link unit (12) is converted into a three-phase AC voltage.

The control unit (40) is constituted by various elements, a microcomputer, or the like. The control unit (40) outputs a control signal (G) to the inverter circuit (13) and controls switching operations of the switching elements (Su, Sv, Sw, Sx, Sy, Sz) in the inverter circuit (13) such that the rotational speed (ω) of the motor (5) approaches a given command value (hereinafter, a speed command value ωm*).

Note that the power conversion apparatus (10) further includes various detectors. The detectors may be a power source phase detecting unit (21), a voltage detecting unit (23), and a current detecting unit (25). The power source phase detecting unit (21) detects a power source phase (θ in) of the power source voltage (Vin) of the AC power source (6). The voltage detecting unit (23) detects the DC link voltage (Vdc) of the DC link unit (12). The current detecting unit (25) detects a DC link current (idc) flowing in a wiring that connects the inverter circuit (13) and a negative terminal of the DC link unit (12). Detection results obtained by these detecting units (21, 23, 25) are input to the control unit (40) and used for control.

<Detailed Configuration of Control Unit>

The control unit (40) performs torque control in which an output torque of the motor (5) is changed to have a fundamental frequency component such that a fundamental frequency is a frequency in accordance with a fluctuation period of the load torque (specifically, a reciprocal of the fluctuation period). In the first embodiment, first control and second control are performed in this torque control. In the first control, an output torque is generated to have a waveform including a fundamental frequency component of the load torque the fundamental frequency of which is the fluctuation period of the load torque and at least one of a fourth harmonic and a sixth harmonic of the power source frequency of the AC power source (6). In the second control, an output torque is generated to have a waveform including at least one of a second harmonic and a third harmonic of the fundamental frequency of the load torque of the motor (5) and a second harmonic of the power source frequency of the AC power source (6).

Figure 2:
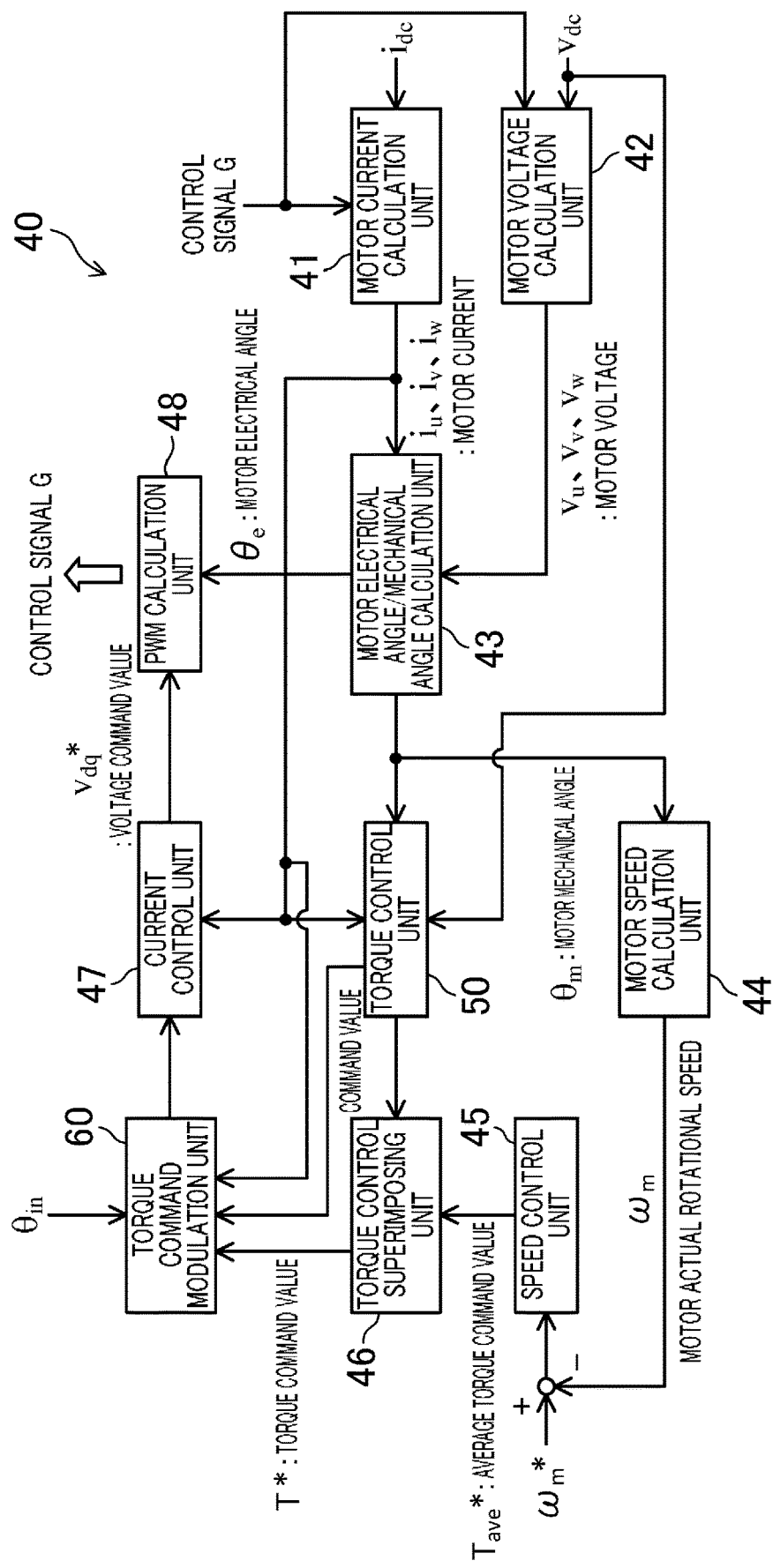
FIG. 2 is a block diagram illustrating details of a control unit according to the first embodiment.

In order to implement the above control, the control unit (40) includes, as illustrated in FIG. 2, a motor current calculation unit (41), a motor voltage calculation unit (42), a motor electrical angle/mechanical angle calculation unit (43), a motor speed calculation unit (44), a speed control unit (45), a torque control unit (50), a torque control superimposing unit (46), a torque command modulation unit (60), a current control unit (47), and a pulse-width modulation (PWM) calculation unit (48).

—Motor Current Calculation Unit—

The motor current calculation unit (41) receives the detected DC link current (idc) and the control signal (G) that the control unit (40) is currently outputting to the inverter circuit (13). The control signal (G) is a gate signal applied to a gate terminal of each of the switching elements (Su, Sv, Sw, Sx, Sy, Sz) constituting the inverter circuit (13). On the basis of the control signal (G) and the input DC link current (idc), the motor current calculation unit (41) calculates motor currents (iu, iv, iw) flowing in the respective phases of the motor (5).

—Motor Voltage Calculation Unit—

The motor voltage calculation unit (42) receives the detected DC link voltage (Vdc) and the above control signal (G). On the basis of the DC link voltage (Vdc) and the control signal (G), the motor voltage calculation unit (42) calculates motor voltages (Vu, Vv, Vw), each of which is an effective value of a voltage between terminals of the motor (5).

—Motor Electrical Angle/Mechanical Angle Calculation Unit—

The motor electrical angle/mechanical angle calculation unit (43) receives the motor currents (iu, iv, iw) calculated by the motor current calculation unit (41) and the motor voltages (Vu, Vv, Vw) calculated by the motor voltage calculation unit (42). On the basis of the motor currents (iu, iv, iw) and the motor voltages (Vu, Vv, Vw), the motor electrical angle/mechanical angle calculation unit (43) calculates a motor electrical angle ($\theta e$). Furthermore, the motor electrical angle/mechanical angle calculation unit (43) divides the motor electrical angle ($\theta e$) by a motor pole logarithm and calculates the result as a motor mechanical angle ($\theta m$).

—Motor Speed Calculation Unit—

The motor speed calculation unit (44) receives the motor mechanical angle ($\theta m$) calculated by the motor electrical angle/mechanical angle calculation unit (43). In accordance with change in the motor mechanical angle ($\theta m$), the motor speed calculation unit (44) calculates an actual rotational speed (hereinafter, a motor actual rotational speed ($\omega m$)) of the motor (5).

—Speed Control Unit—

The speed control unit (45) receives a deviation between the speed command value ($\omega m^*$) and the motor actual rotational speed ($\omega m$). On the basis of the deviation, for example, the speed control unit (45) performs PI calculation (proportion and integration) and calculates an average of the load torque of the motor (5) (hereinafter, an average torque (Tave)) so as to control the motor actual rotational speed ($\omega m$) to conform to the speed command value ($\omega m^*$). The speed control unit (45) outputs the average torque (Tave) as a command value (an average torque command value (Tave*)) to the torque control superimposing unit (46).

Note that the average torque is an average value of the load torque that has ripple in a predetermined period.

—Torque Control Unit—

The torque control unit (50) receives the motor mechanical angle ($\theta m$) calculated by the motor electrical angle/mechanical angle calculation unit (43), the motor currents (iu, iv, iw) calculated by the motor current calculation unit (41), and the detected DC link voltage (Vdc). In addition, a deviation between a compressor load torque and the motor torque becomes a vibration torque. The vibration torque causes the compressor to vibrate, and the motor mechanical angle ($\theta m$) fluctuates. On the basis of the input values, the torque control unit (50) outputs a command value having a vibration suppression waveform in order to perform control for reducing fluctuation in the motor mechanical angle ($\theta m$) caused by the vibration torque.

Figure 3:
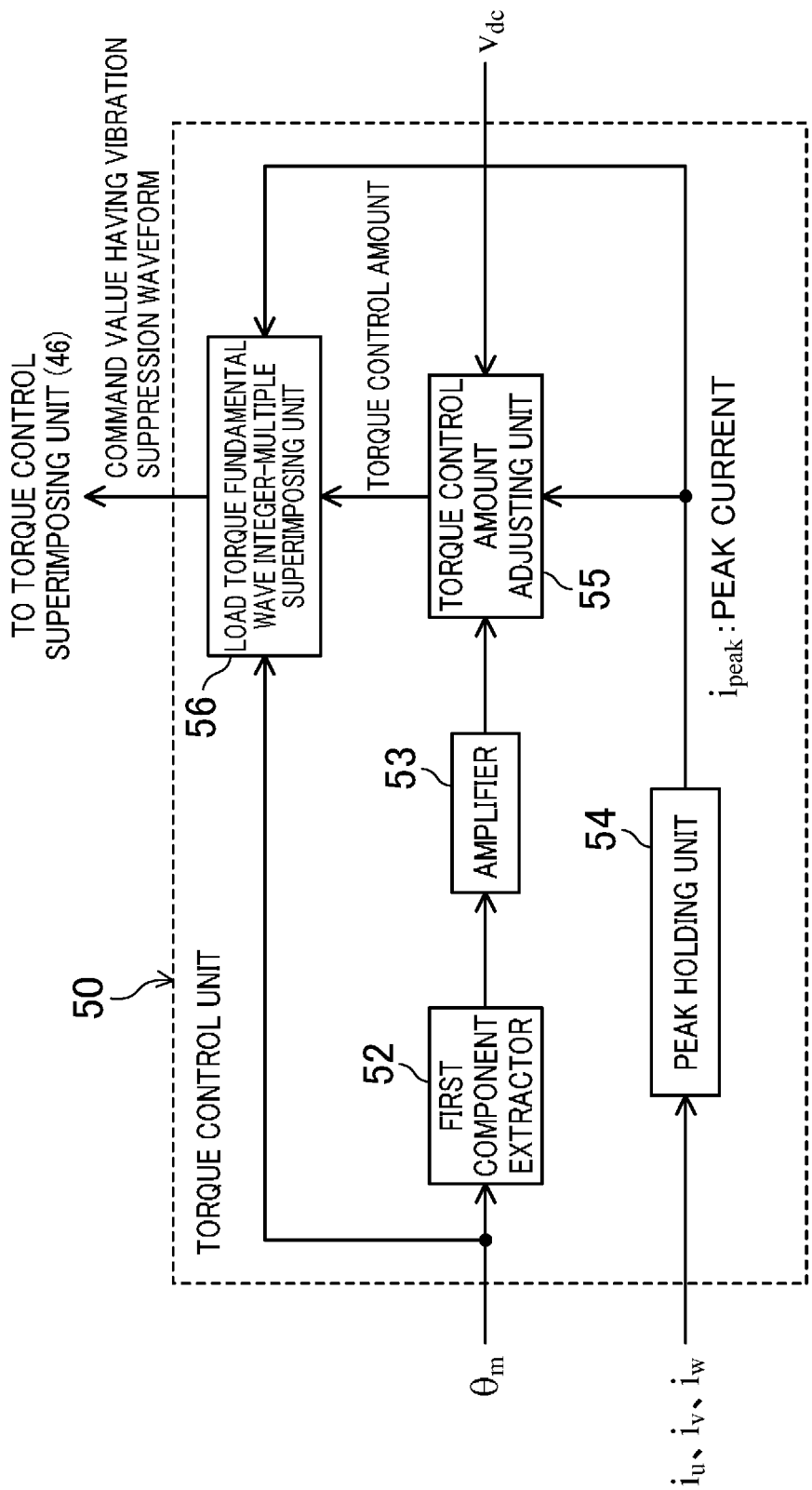
FIG. 3 is a block diagram illustrating details of a torque control unit according to the first embodiment.

Specifically, as illustrated in FIG. 3, the torque control unit (50) includes a first component extractor (52), an amplifier (53), a peak holding unit (54), a torque control amount adjusting unit (55), and a load torque fundamental wave integer-multiple superimposing unit (56).

—First Component Extractor—

The first component extractor (52) receives the motor mechanical angle ($\theta m$). The first component extractor (52) extracts, through the Fourier transform, a first component (a fundamental frequency component) that most affects the vibration of the motor (5) from among ripple components of the load torque of the motor (5).

—Amplifier—

The amplifier (53) multiplies the first component extracted by the first component extractor (52) by a predetermined gain to amplify the first component.

—Peak Holding Unit—

The peak holding unit (54) receives the motor currents (iu, iv, iw). The peak holding unit (54) holds the maximum value of the absolute values of the motor currents (iu, iv, iw) over a predetermined determination period and obtains a peak current (ipeak).

—Torque Control Amount Adjusting Unit—

The torque control amount adjusting unit (55) receives the peak current (ipeak), the amplified first component, and the detected DC link voltage (Vdc). On the basis of these input values, the torque control amount adjusting unit (55) generates a value (hereinafter, a torque control amount) serving as a basis for the command value by which the above average torque command value (Tave*) is to be multiplied and outputs the torque control amount to the load torque fundamental wave integer-multiple superimposing unit (56).

The torque control amount is a fundamental frequency component of the load torque. The torque control superimposing unit (46) multiplies the average torque command value (Tave*) and the output of the torque control unit (50) to obtain a torque command value (T*). In a case where a variation width of the torque command value (T*) is the same as the average torque command value (Tave*), a ratio of the amplitude of the first component to the average torque is defined as the torque control amount=100%.

—Load Torque Fundamental Wave Integer-Multiple Superimposing Unit—

The load torque fundamental wave integer-multiple superimposing unit (56) receives the torque control amount, the motor mechanical angle ($\theta m$), and the peak current (ipeak). The load torque fundamental wave integer-multiple superimposing unit (56) performs processing for superimposing a harmonic on a waveform generated on the basis of the torque control amount in accordance with these input values.

Figure 4:
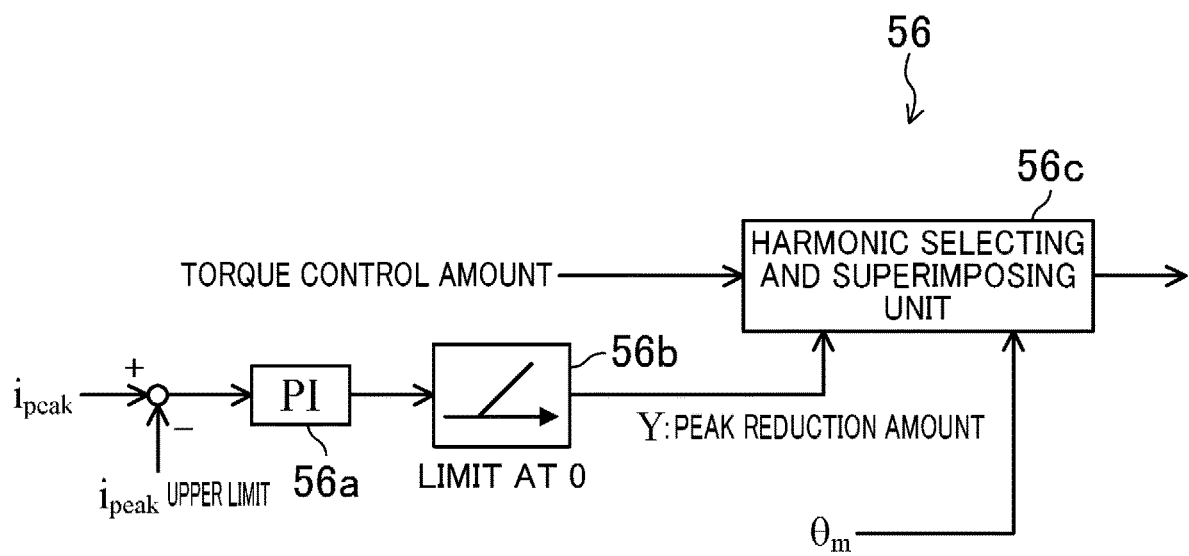
FIG. 4 is a block diagram illustrating details of a load torque fundamental wave integer-multiple superimposing unit.

As illustrated in FIG. 4, the load torque fundamental wave integer-multiple superimposing unit (56) includes a PI control unit (56a), a limit unit (56b), and a harmonic selecting and superimposing unit (56c).

Upon receiving a deviation between the peak current (ipeak) and the upper limit thereof, the PI control unit (56a) performs PI calculation (proportion and integration) on the basis of the deviation. The calculation results of the PI calculation are subjected to limit processing in the limit unit (56b) for cutting negative values, and only positive values are input to the harmonic selecting and superimposing unit (56c) as a peak reduction amount (Y). In accordance with the magnitude of the torque control amount from the torque control amount adjusting unit (55), the harmonic selecting and superimposing unit (56c) determines whether any harmonic is to be superimposed on the fundamental frequency component of the load torque (i.e., the torque control amount). Furthermore, if any harmonic is to be superimposed, in accordance with the peak reduction amount (Y), the harmonic selecting and superimposing unit (56c) selects the harmonic is to be superimposed.

Through the processing performed by the harmonic selecting and superimposing unit (56c), a value obtained after the harmonic is superimposed on a waveform generated on the basis of the torque control amount is output from the torque control unit (50) as a command value having a vibration suppressing effect.

Details of the processing performed by the harmonic selecting and superimposing unit (56c) will be described in <Harmonic Selecting and Superimposing Processing>.

—Torque Control Superimposing Unit—

Referring back to FIG. 2, the torque control superimposing unit (46) receives the average torque command value (Tave*) and the above command value output from the torque control unit (50). The torque control superimposing unit (46) multiplies these values to generate the torque command value (T*) in which the ripple component of the load torque of the motor is superimposed. The torque command value (T*) is input to the torque command modulation unit (60).

—Torque Command Modulation Unit—

The torque command modulation unit (60) receives the detected power source phase (gin) of the power source voltage (Vin), the torque command value (T*) from the torque control superimposing unit (46), the motor currents (iu, iv, iw) from the motor current calculation unit (41), and the torque control amount. The torque command modulation unit (60) causes the torque command value (T*) to have ripple (modulates the torque command value (T*)) in accordance with the power source phase (gin) of the AC power source (6).

Figure 5:
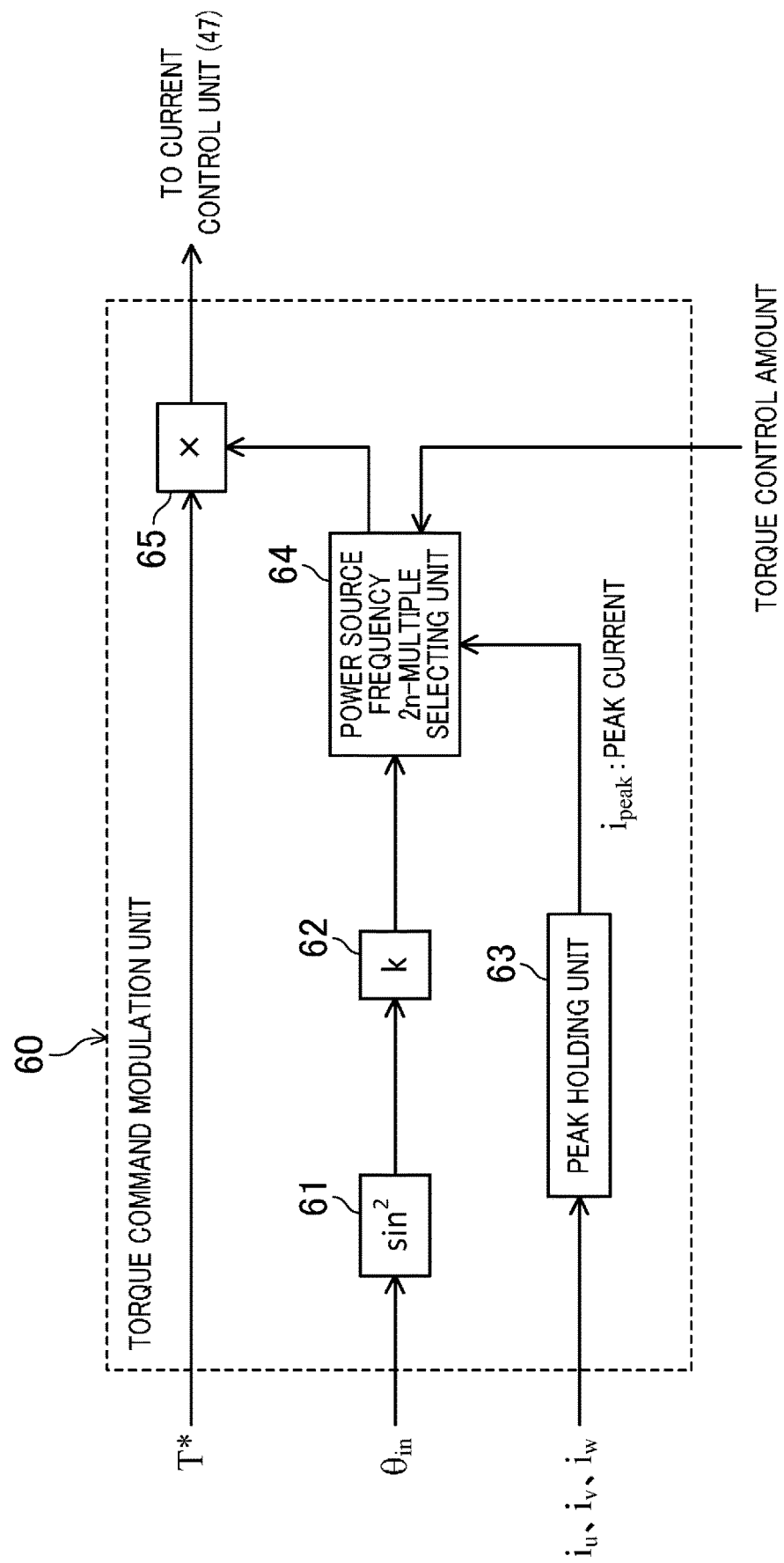
FIG. 5 is a block diagram illustrating details of a torque command modulation unit according to the first embodiment.

Specifically, as illustrated in FIG. 5, the torque command modulation unit (60) includes a first coefficient generating unit (61), a second coefficient generating unit (62), a peak holding unit (63), a power source frequency 2n-multiple selecting unit (64), and a multiplying unit (65). Note that "n" is an integer of 1 or more.

—First Coefficient Generating Unit and Second Coefficient Generating Unit—

The first coefficient generating unit (61) receives the power source phase (gin) of the AC power source (6). The first coefficient generating unit (61) performs calculation for generating a sine sin θ in from the power source phase (gin) and squares it. Upon reception of the calculation result of the first coefficient generating unit (61), the second coefficient generating unit (62) performs calculation for multiplying it by K.

—Peak Holding Unit—

The peak holding unit (63) receives the motor currents (iu, iv, iw). The peak holding unit (63) holds the maximum value of the absolute values of the motor currents (iu, iv, iw) over a predetermined determination period and obtains a peak current (ipeak).

—Power Source Frequency 2n-Multiple Selecting Unit—

The power source frequency 2n-multiple selecting unit (64) receives the value obtained by multiplying the square of the sine wave sin θ in by K, the peak current (ipeak), and the torque control amount. On the basis of these input values, the power source frequency 2n-multiple selecting unit (64) selects a harmonic to be superimposed on the torque command value (T*).

Figure 6:
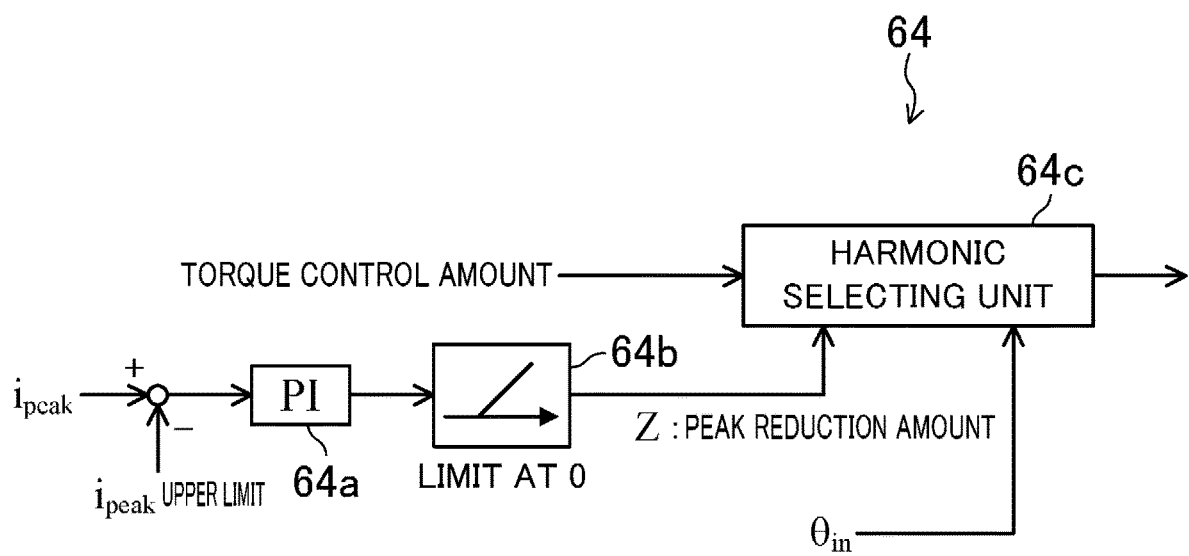
FIG. 6 is a block diagram illustrating details of a power source frequency 2n-multiple selecting unit.

As illustrated in FIG. 6, the power source frequency 2n-multiple selecting unit (64) includes a PI control unit (64a), a limit unit (64b), and a harmonic selecting unit (64c).

Upon receiving a deviation between the peak current (ipeak) and the upper limit thereof, the PI control unit (64a) performs PI calculation (proportion and integration) on the basis of the deviation. The calculation results of the PI calculation are subjected to limit processing in the limit unit (64b) for cutting negative values, and only positive values are input to the harmonic selecting unit (64c). In accordance with the magnitude of the torque control amount input from the torque control amount adjusting unit (55), the harmonic selecting unit (64c) determines whether any power source frequency harmonic is to be superimposed on the torque command value (T*). Furthermore, if any harmonic is determined to be superimposed, the harmonic selecting unit (64c) selects the harmonic is to be superimposed.

Details of the processing mainly performed by the harmonic selecting unit (64c) will be described in <Harmonic Selecting and Superimposing Processing>.

—Multiplying Unit—

Referring back to FIG. 5, the multiplying unit (65) receives an output of the power source frequency 2n-multiple selecting unit (64) and the torque command value (T*). The multiplying unit (65) multiplies the torque command value (T*) by the output of the power source frequency 2n-multiple selecting unit (64), thereby modulating the torque command value (T*) by using the output of the power source frequency 2n-multiple selecting unit (64).

—Current Control Unit—

Referring back to FIG. 2, the current control unit (47) receives an output of the torque command modulation unit (60) and the like. On the basis of these input values, the current control unit (47) generates a voltage command value (Vdq*) and outputs the voltage command value (Vdq*) to the PWM calculation unit (48).

—PWM Calculation Unit—

The PWM calculation unit (48) receives the voltage command value (Vdq*) from the current control unit (47) and the motor electrical angle (θe) from the motor electrical angle/mechanical angle calculation unit (43). On the basis of these input values, the PWM calculation unit (48) generates a control signal (G) for controlling on and off operations of the switching elements (Su, Sv, Sw, Sx, Sy, Sz) in the inverter circuit (13). Thus, the switching elements (Su, Sv, Sw, Sx, Sy, Sz) can be turned on and off at a predetermined duty.

<Harmonic Selecting and Superimposing Processing>

Figure 7:
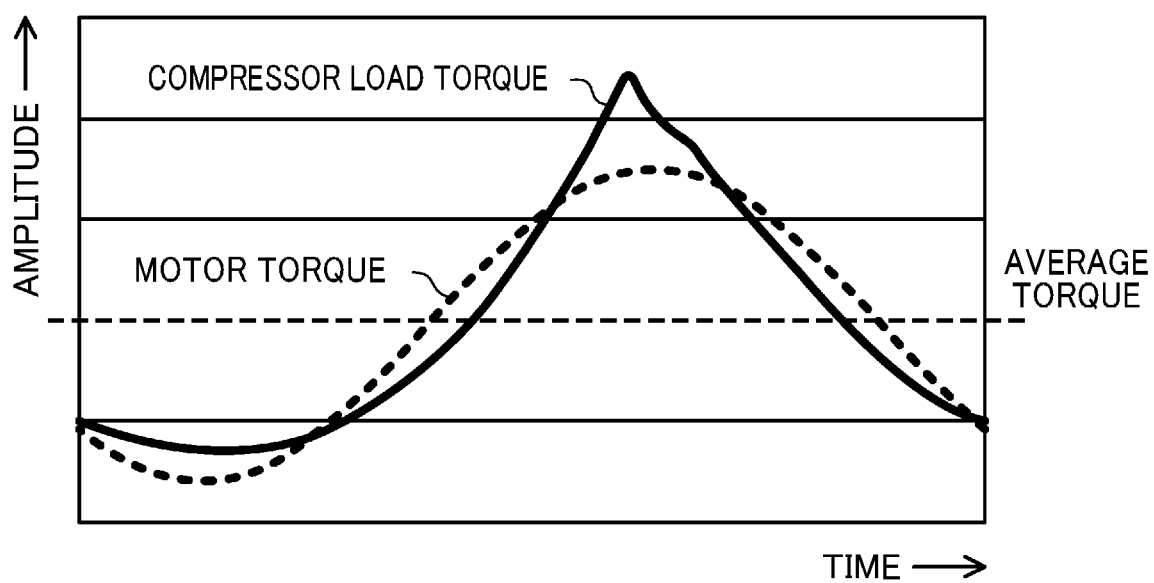
FIG. 7 illustrates typical vibration suppression control.

The deviation between the compressor load torque and the motor torque becomes a vibration torque, and the vibration torque causes the compressor to vibrate. Typically, in order to suppress vibration caused by the largest, fundamental frequency component of the compressor load torque, torque control is performed so as to cause the motor torque to have ripple in accordance with the fundamental wave of the compressor load torque as illustrated in FIG. 7. By this control, the motor torque has ripple with the same phase as that of the fundamental wave of the compressor load torque.

In such control, the torque control amount is used as a vibration suppressing component for suppressing vibration caused by the largest, fundamental frequency component of the compressor load torque. By increasing the vibration suppressing component to reduce the vibration torque, the vibration of the compressor is reduced.

However, by increasing the vibration suppressing component, the peak of current flowing in the inverter circuit (13) or the motor (5) increases. In contrast, by decreasing the vibration suppressing component, although the current peak decreases, the vibration of the compressor increases. That is, decrease of the current peak and suppression of the vibration of the compressor have a trade-off relationship.

In contrast, the control unit (40) according to the first embodiment performs the above first control and the above second control in the torque control for changing the output torque of the motor (5) in order to achieve both reduction of the vibration of the compressor and decrease of the current peak. Specifically, as the first control and the second control, the control unit (40) performs harmonic selecting and superimposing processing in the torque control unit (50) and the torque command modulation unit (60) for selecting whether any harmonic is to be superimposed in accordance with the torque control amount and for selecting and superimposing an appropriate harmonic if the harmonic is to be superimposed.

In the following description, the first control and the second control will be separately described as harmonic selecting and superimposing processing performed by the torque control unit (50) and harmonic selecting and superimposing processing performed by the torque command modulation unit (60) for convenience of the description.

<Harmonic Selecting and Superimposing Processing Performed by Torque Control Unit>

Figure 8:
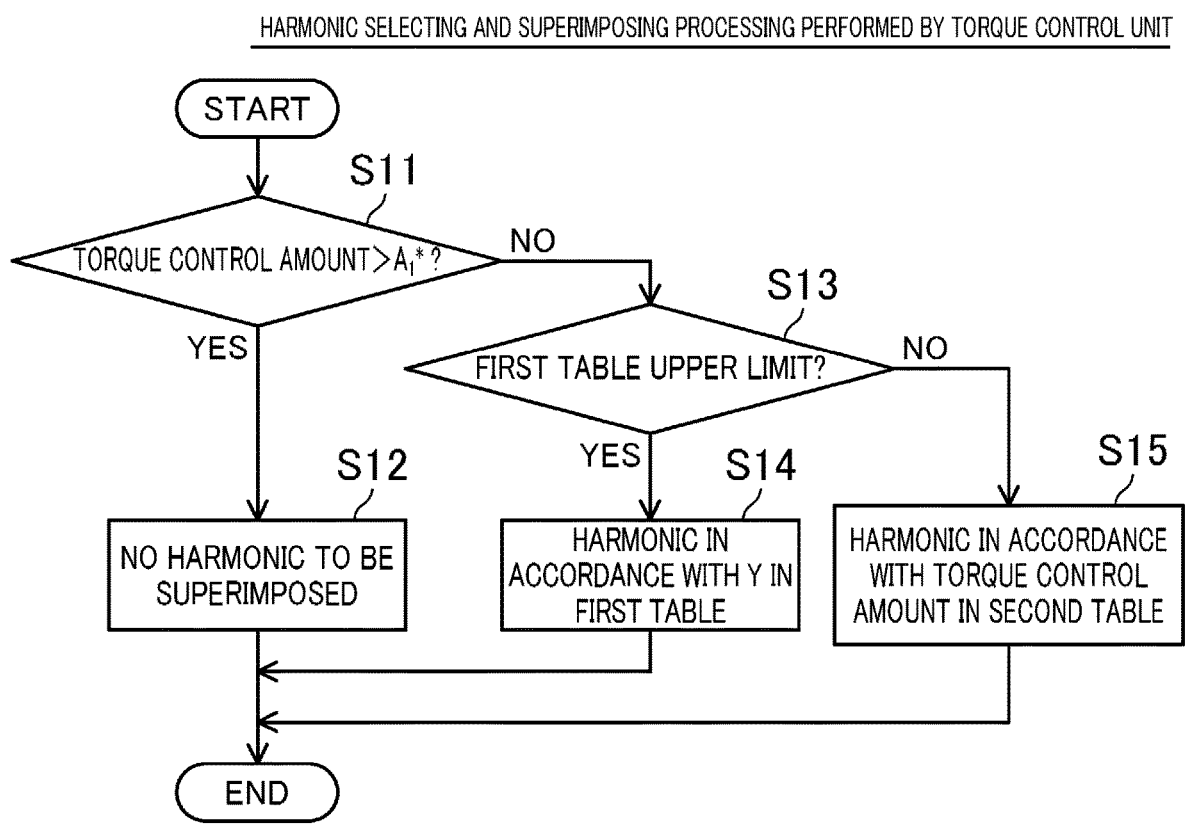
FIG. 8 illustrates a flow of harmonic selecting and superimposing processing performed by the torque control unit.

The harmonic selecting and superimposing processing performed by the torque control unit (50) corresponds to part of the above second control and is performed by the harmonic selecting and superimposing unit (56c). FIG. 8 illustrates a flow of the harmonic selecting and superimposing processing performed by the torque control unit (50).

As illustrated in FIG. 8, the harmonic selecting and superimposing unit (56c) compares the input torque control amount with a predetermined amount ($A_1$*) (step S11). Note that the predetermined amount ($A_1$*) is determined as appropriate in advance to a given value that is greater than or equal to 0 in accordance with the specification or the like of the compressor, which is a load apparatus.

If the torque control amount is greater than the predetermined amount ($A_1$*) (Yes in step S11), the harmonic selecting and superimposing unit (56c) determines that the vibration of the compressor is sufficiently reduced with the current torque control amount and that the motor current peak is less than or equal to the upper limit, and determines that no harmonic is to be superimposed on the fundamental frequency component of the load torque (step S12).

Figure 9:
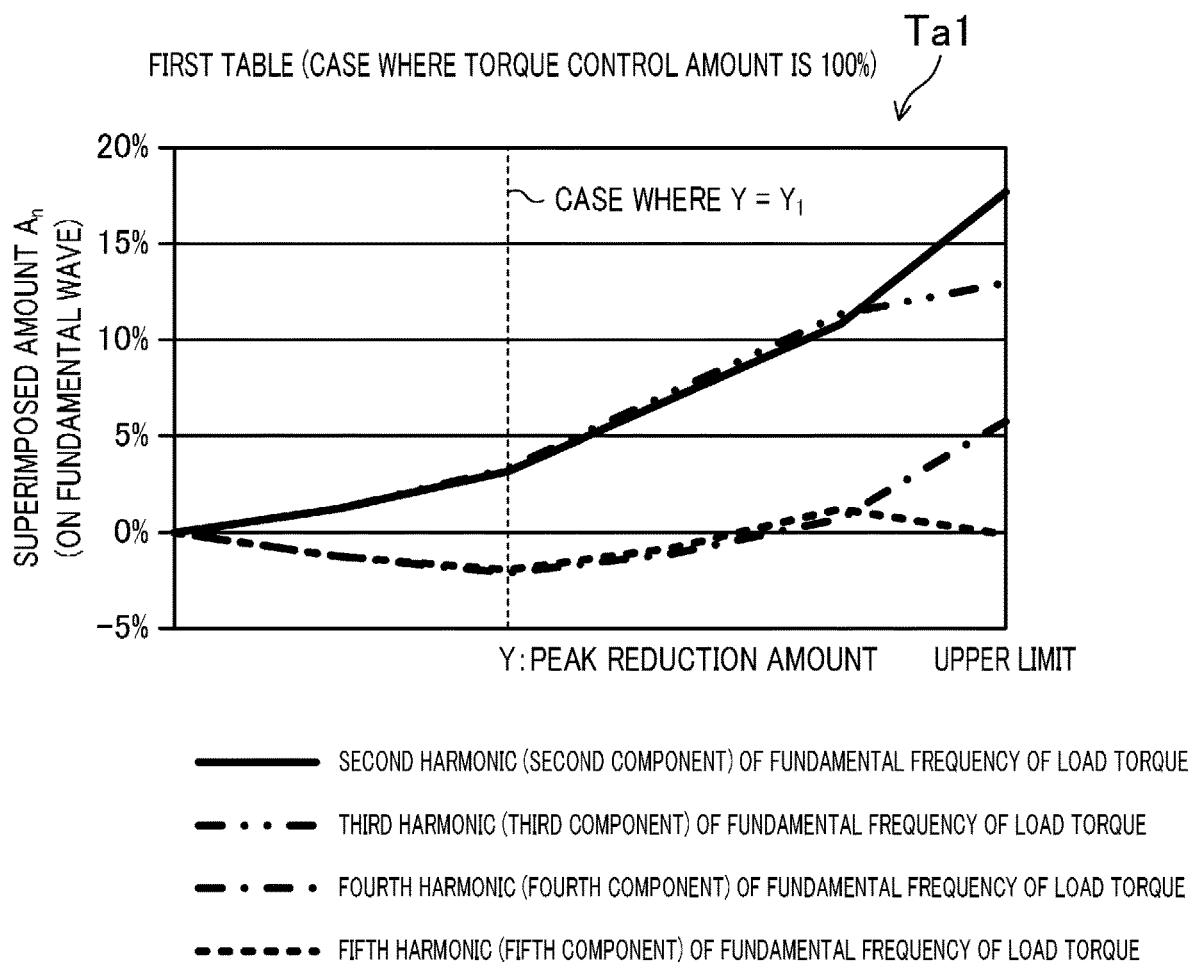
FIG. 9 is a conceptual diagram of a first table.

If the torque control amount is less than or equal to the predetermined amount ($A_1$*) (No in step S11), the harmonic selecting and superimposing unit (56c) compares the peak reduction amount (Y) from the limit unit (56b) illustrated in FIG. 4 and the upper limit in a first table (Ta1) illustrated in FIG. 9 (step S13).

If the peak reduction amount (Y) is less than the upper limit in the first table (Ta1) (Yes in step S13), by using the first table (Ta1), the harmonic selecting and superimposing unit (56c) selects the type of the harmonic in accordance with the peak reduction amount (Y) and superimposes the harmonic on the fundamental frequency component of the load torque (step S14). If the peak reduction amount (Y) is greater than or equal to the upper limit in the first table (Ta1) (No in step S13), by using a second table (Ta2), the harmonic selecting and superimposing unit (56c) selects the type of the harmonic in accordance with the torque control amount and superimposes the harmonic on the fundamental frequency component of the load torque (step S15).

Now, the first and second tables (Ta1, Ta2) will be described.

—Step for Creating First Table—

The first table (Ta1) is information defining a harmonic that is an optimal frequency component to be superimposed on the fundamental frequency component of the load torque in order to reduce both the vibration of the compressor and the current peak. The first table (Ta1) is created through the following steps 1 to 5 prior to the harmonic selecting and superimposing processing and stored in a memory (not illustrated) included in the torque control unit (50).

Note that when the fundamental frequency component of the load torque is represented as "$A^*\sin(\theta m+\theta_1)$", a second component of the fundamental frequency of the load torque, a third component of the fundamental frequency of the load torque, a fourth component of the fundamental frequency of the load torque, and a fifth component of the fundamental frequency of the load torque can be represented as "$A_2 \sin(2(\theta m+\theta_1-\theta_2))$", "$A_3 \sin(3(\theta m+\theta_1-\theta_3))$", "$A_4 \sin(4(\theta m+\theta_1-\theta_4))$", and "$A_5 \sin(5(\theta m+\theta_1-\theta_5))$", respectively. Herein, "$\theta m+\theta 1$" represents the phase of the fundamental frequency component of the load torque. "$2\theta m+2\theta_1-2\theta_2$", "$3\theta m+3\theta_1-3\theta_3$", "$4\theta m+4\theta_1-4\theta_4$", and "$5\theta m+5\theta_1-5\theta_5$" appearing when the polynomial expression in parentheses in each expression are expanded represent the phase in a corresponding harmonic.

(Step 1): First, "$A^*$", which is the value of an amplitude of the fundamental frequency component of the load torque is determined to a given value. At this time, considering a vibration amount or vibration sound of the compressor, which is a design specification, "$A^*$" is preferably determined to a value that may allow these. Note that "$A^*$" is a fixed value in step 1, and $A^*=A_1^*$.

(Step 2): Subsequently, the allowable range for a case where the output torque of the motor (5) is negative (negative torque) is determined. If the output torque of the motor (5) is negative, a regeneration operation of energy from the motor (5) to the capacitor (C) in the DC link unit (12) occurs, and the DC link voltage (Vdc) suddenly rises. At this time, depending on the regeneration amount of the energy, the DC link voltage (Vdc) may rise to exceed the breakdown voltage of the switching elements (Su, Sv, Sw, Sx, Sy, Sz) and cause overvoltage, and the inverter circuit (13) may break down. Thus, the allowable range of the negative torque is determined so that such breakdown does not occur.

(Step 3): Subsequently, a harmonic to be superimposed on the fundamental frequency component of the load torque is selected. At this time, the second component and the third component are always selected, and the fourth component and higher harmonics are selected as appropriate.

(Step 4): Subsequently, the phase in a range that can reduce the current peak is selected as the phase of the harmonic component of the fundamental frequency of the load torque. Specifically, when the phase with which the waveform of the fundamental wave of the load torque becomes a positive value from a negative value is 0°, the phase with which the waveform of the second harmonic (second component) of the fundamental frequency of the load torque becomes a positive value from a negative value is determined to fall within, as illustrated in FIG. 10(a), a range from 0° to 180° in the phase of the second component, preferably a predetermined range A that is "greater than or equal to 45°+180m° (m: integer) and less than or equal to 135°+180m°". This value is represented as "greater than or equal to 22.5°+90m° (m: integer) and less than or equal to 67.5°+90m°" in the phase of the fundamental frequency component of the load torque. The phase with which the waveform of the third harmonic (third component) of the fundamental frequency of the load torque becomes a positive value from a negative value is determined to fall within, as illustrated in FIG. 10(b), a predetermined range B that is "greater than or equal to −45°+180m° (m: integer) and less than or equal to 45°+180m°" in the phase of the third component. This value is represented as "greater than or equal to −15°+60m° (m: integer) and less than or equal to 15°+60m°" in the phase of the fundamental frequency component of the load torque.

Figure 10:
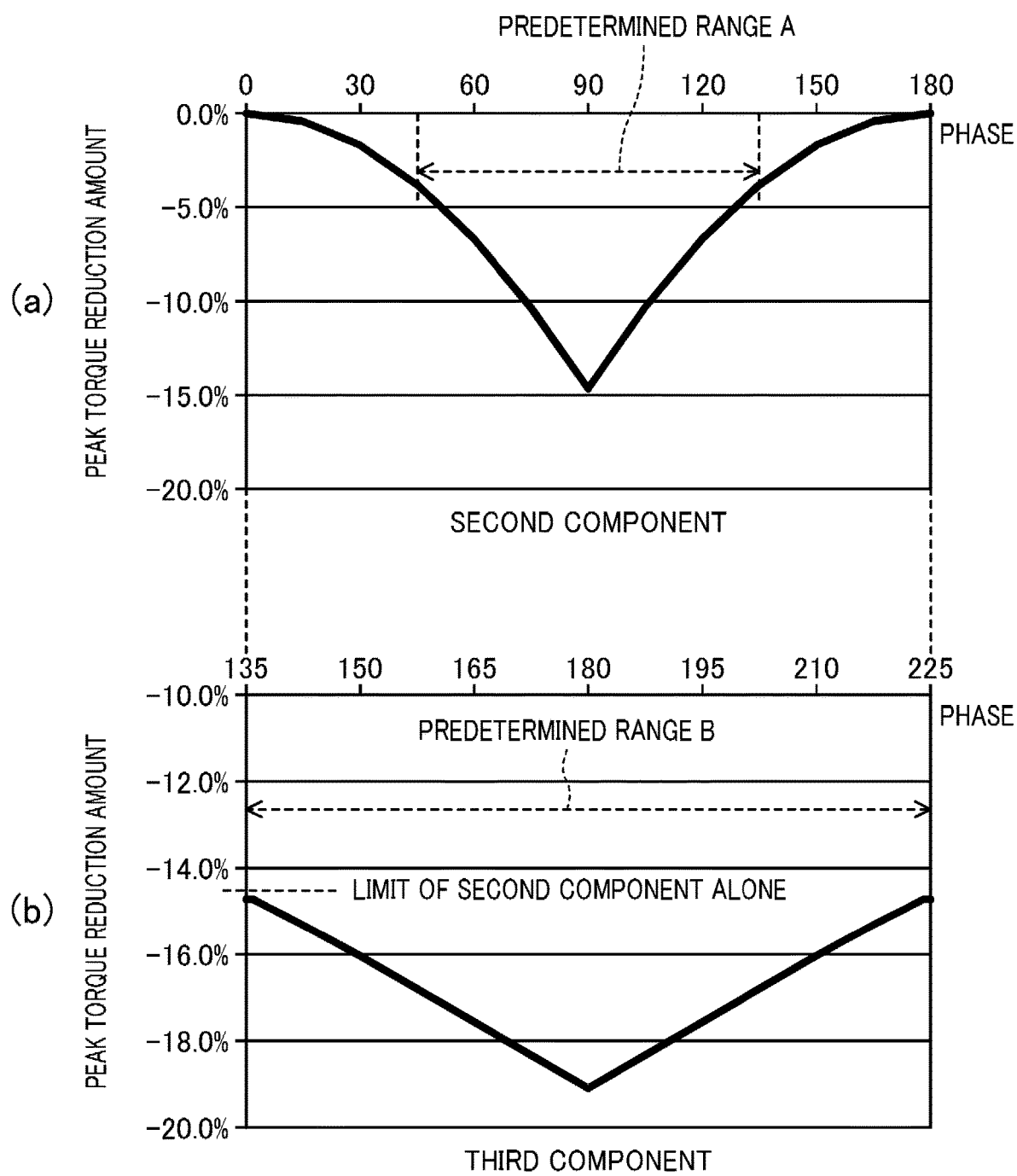
FIG. 10 illustrates ranges of phases of harmonics.

FIG. 10 is examples of graphs obtained by calculating a peak torque reduction amount for the values "$2\theta_2$" and "$3\theta_3$" with the second component and the third component through desktop calculations. For reference, FIG. 10(a) illustrates the value "$2\theta_2$" from 0 to 180° with only the second component. As illustrated in FIG. 10(a), with the second component, the peak torque reduction amount becomes the maximum with "$2\theta_2$" of about 90°, and a range of ±45° with the maximum at the center is set as the predetermined range A that can reduce the current peak. As illustrated in FIG. 10(b), with both the second component and the third component, the peak torque reduction amount becomes the maximum with "$3\theta_3$" of about 180°, and a range of ±45° with the maximum at the center is set as the predetermined range B that can reduce the current peak. The peak torque reduction amount in the predetermined range B by using both the second component and the third component generally illustrate a reduction amount larger than the maximum of the peak torque reduction amount in the predetermined range A of the second component.

Although the vertical axis in FIG. 10 is "torque" and is not current, since the torque is obtained by an outer product of a current and a magnetic flux, the current peak and the peak torque have correlation. Thus, as the peak torque reduction amount is larger, the current peak reduction amount is larger.

(Step 5): Subsequently, on the basis of the results of the steps 1 to 4, the amplitude of the harmonic is optimized such that the torque peak (current peak) gradually decreases.

Through steps 1 to 5 in this manner, the first table (Ta1) illustrated in FIG. 9 is completed.

In the first table (Ta1) illustrated in FIG. 9, the horizontal axis is the peak reduction amount (Y), and the vertical axis is superimposed amounts (An) of the harmonics on the fundamental frequency component of the load torque. The superimposed amount of each of the second component to the fifth component of the fundamental frequency of the load torque with respect to the peak reduction amount (Y) is illustrated. For example, if the peak reduction amount (Y) is a value "Y1", the superimposed amounts at points where the graphs of the second component to the fifth component and the broken line extending in the vertical direction of FIG. 9 intersect with each other are amounts effective for suppressing the vibration of the compressor and the current peak.

Note that in the first table (Ta1), the peak reduction amount (Y) is changed to the upper limit to calculate the superimposed amounts (An) of the harmonics with respect to each peak reduction amount (Y). The upper limit is a limit value of the peak reduction amount when the torque peak is no more decreased even if a harmonic is superimposed.

—Example of Harmonic Selecting and Superimposing Processing using First Table—

The harmonic selecting and superimposing unit (56c) in the torque control unit (50) applies the input peak reduction amount (Y) to the above first table (Ta1) to determine the superimposed amounts (An) of harmonics (the second component, the third component, and the like) to be superimposed on the fundamental frequency component of the load torque. The harmonic selecting and superimposing unit (56c) superimposes the harmonics so as to gradually decrease the torque peak while maintaining the vibration suppressing component, which is the torque control amount, at 100%.

Figure 11:
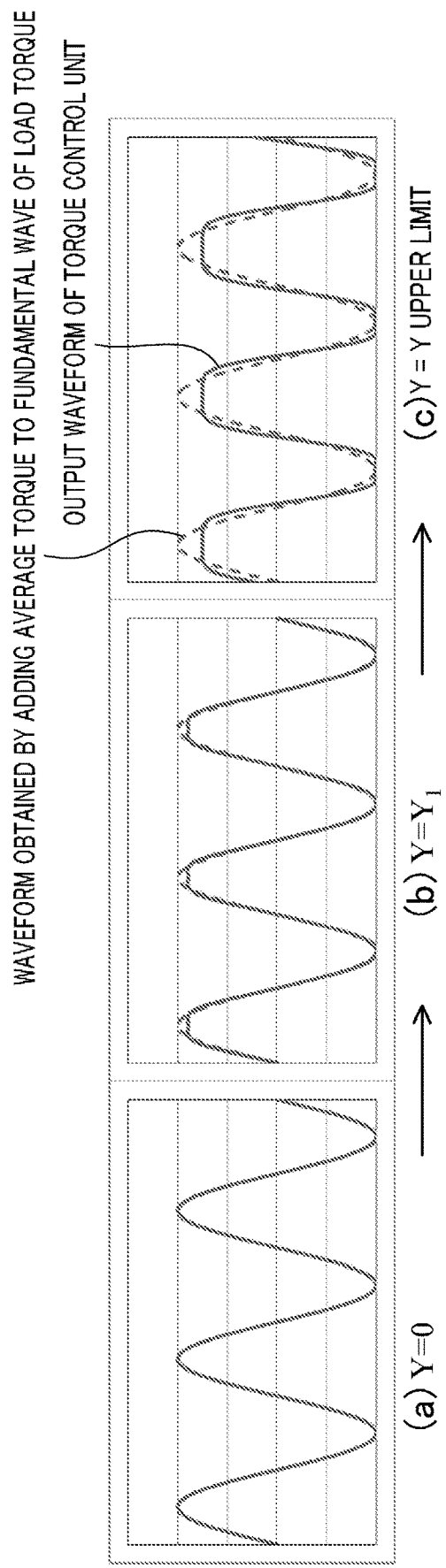
FIG. 11 illustrates comparison between a waveform obtained by adding an average torque to a waveform of a fundamental wave of a load torque and an output waveform of the torque control unit that has performed the harmonic selecting and superimposing processing using the first table.

For example, in a case where the peak reduction amount (Y) is zero, on the basis of the first table (Ta1), none of the second to fifth components are to be superimposed. Thus, as illustrated in "(a) Y=0" in FIG. 11, an output waveform of the torque control unit (50) (i.e., a vibration suppression waveform) is identical with a waveform obtained by adding the average torque to the fundamental wave of the load torque. In a case where the peak reduction amount (Y) is Y1, the second to fifth components are superimposed on the fundamental frequency component of the load torque, and as illustrated in "(b) Y=Y1" in FIG. 11, an output waveform of the torque control unit (50) is synchronized with a waveform obtained by adding the average torque to the fundamental wave of the load torque, but the peak of the output waveform is lower than the peak of the waveform obtained by adding the average torque to the fundamental wave of the load torque. In a case where the peak reduction amount (Y) is the upper limit, according to the first table (Ta1), the superimposed amounts of the second to fifth components on the fundamental frequency component of the load torque are the maximums, and as illustrated in "(c) Y=Y upper limit" in FIG. 11, the peak of the output waveform of the torque control unit (50) is even lower than the peak of the waveform in FIG. 11(b).

In the above manner, as the peak reduction amount (Y) approaches the upper limit in the first table (Ta1), the peak value of the output waveform of the torque control unit (50) decreases. Thus, in the harmonic selecting and superimposing processing performed by the torque control unit (50) using the first table (Ta1), a deviation between the peak of the output waveform of the torque control unit (50) and the peak of the waveform of the fundamental wave of the load torque is an element that suppresses the vibration of the compressor and that decreases the current peak.

Note that the first table (Ta1) is generated by a method including the above step 1. Thus, in the harmonic selecting and superimposing processing using the first table (Ta1), the current peak can be decreased in a state where the torque control amount (i.e., the vibration suppressing component) represented by the amplitude A* of the fundamental frequency component of the load torque is set to the fixed value $A_1^*$.

—Step for Creating Second Table—

As described with reference to FIG. 8, the second table (Ta2) is used if the peak reduction amount (Y) exceeds the upper limit in the above first table (Ta1). The second table (Ta2) may be information used to decrease the torque peak by decreasing the vibration suppressing component, which is the torque control amount, if the torque peak (current peak) cannot be decreased any more with the first table (Ta1).

Figure 12:
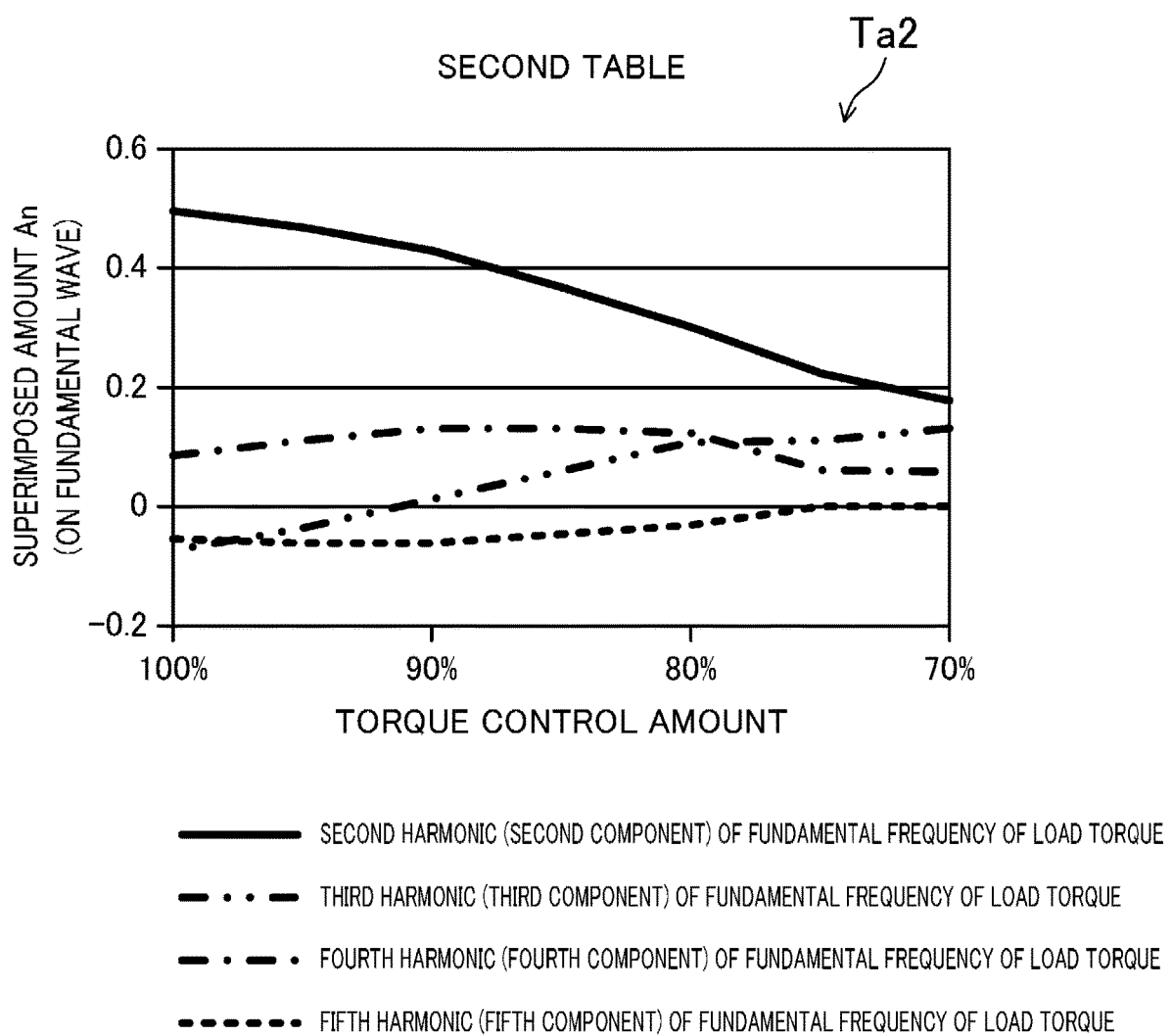
FIG. 12 is a conceptual diagram of a second table.

The second table (Ta2) illustrated in FIG. 12 is created through the steps 2 to 4 from the above steps 1 to 5 and further the following step 6.

(Step 6): On the basis of the results of the above steps 2 to 4, the amplitudes of the harmonics are optimized such that the torque peak is minimized in accordance with the torque control amount, which is the vibration suppressing component (i.e., the fundamental frequency component of the load torque).

In the first table (Ta2) illustrated in FIG. 12, the horizontal axis is the torque control amount, and the vertical axis is superimposed amounts (An) of the harmonics on the fundamental frequency component of the load torque. The superimposed amount of each of the second component to the fifth component of the fundamental frequency of the load torque with respect to the torque control amount is illustrated. In the second table (Ta2), the superimposed amount (An) of each harmonic when the torque control amount is gradually decreased from "100%" is calculated.

—Example of Harmonic Selecting and Superimposing Processing using Second Table—

The harmonic selecting and superimposing unit (56c) in the torque control unit (50) applies the input torque control amount to the above second table (Ta2) to determine the superimposed amounts (An) of harmonics (the second component, the third component, and the like) to be superimposed on the torque control amount (the vibration suppressing component, i.e., the fundamental frequency component of the load torque). The harmonic selecting and superimposing unit (56c) superimposes the harmonics so as to gradually decrease the torque peak by decreasing the vibration suppressing component, which is the torque control amount.

Figure 13:
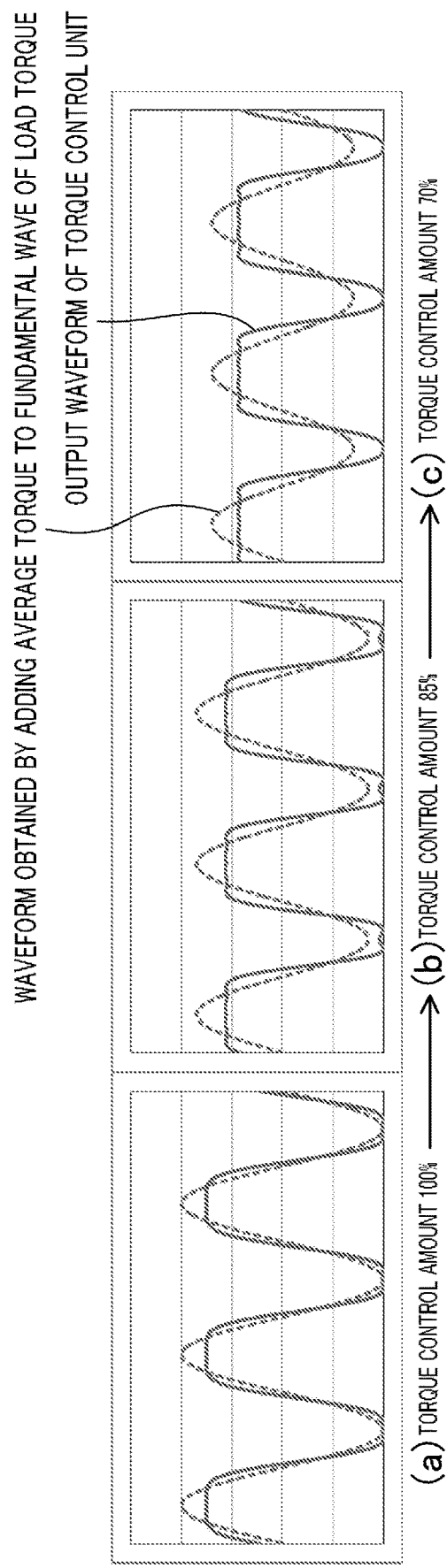
FIG. 13 illustrates comparison between a waveform obtained by adding an average torque to a waveform of a fundamental wave of a load torque and an output waveform of the torque control unit that has performed the harmonic selecting and superimposing processing using the second table.

For example, in a case where the torque control amount is 100%, on the basis of the second table (Ta2), the superimposed amounts (An) of the second to fifth components are determined as "0.17", "0.13", "0.08", and "0.00", respectively. Thus, as illustrated in "(a) torque control amount 100%" in FIG. 13, the peak of the output waveform of the torque control unit (50) is lower than the peak of the waveform of the fundamental wave, as in FIG. 11(c). In a case where the torque control amount is 85%, as illustrated in "(b) torque control amount 85%" in FIG. 13, the output waveform of the torque control unit (50) is synchronized with the waveform of the fundamental wave of the load torque, but is generally lower than the output waveform illustrated in FIG. 13(a), and the peak is even lower. In a case where the torque control amount is 70%, as illustrated in "(c) torque control amount 70%" in FIG. 13, the output waveform of the torque control unit (50) is generally lower than the output waveform illustrated in FIG. 13(b), and the peak is even lower.

In the above manner, as the torque control amount is decreased, the peak value of the output waveform of the torque control unit (50) decreases. Thus, in the harmonic selecting and superimposing processing performed by the torque control unit (50) using the second table (Ta2), although it is difficult to reduce the vibration of the compressor, a deviation between the peak of the waveform of the fundamental wave of the load torque and the peak of the output waveform of the torque control unit (50) is an element that decreases the current peak.

Note that the second table (Ta2) is generated by a method not including the above step 1. Thus, in the harmonic selecting and superimposing processing using the second table (Ta2), the torque control amount (i.e., the vibration suppressing component) represented by the amplitude A* of the fundamental frequency component of the load torque is a variable value, and the current peak can be decreased.

<Harmonic Selecting and Superimposing Processing Performed by Torque Command Modulation Unit>

Figure 14:
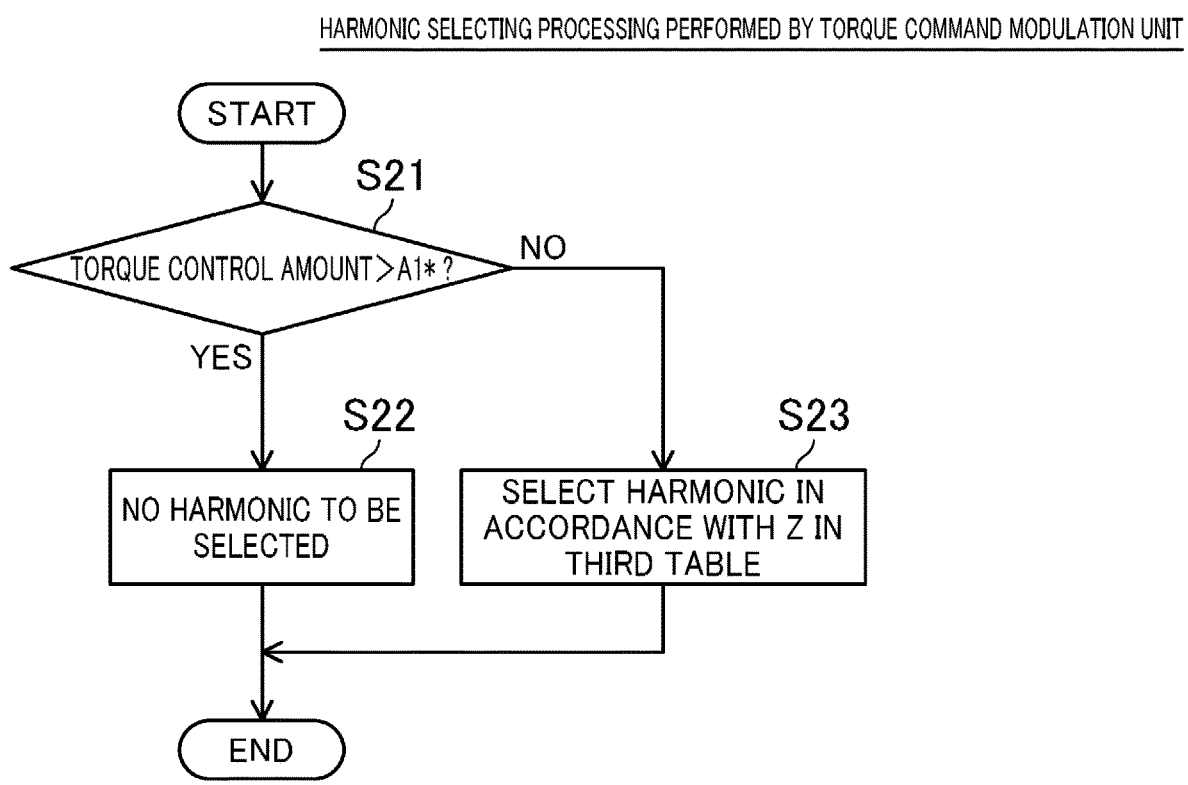
FIG. 14 illustrates a flow of harmonic selecting processing performed by the torque command modulation unit.

The harmonic selecting and superimposing processing performed by the torque command modulation unit (60) corresponds to the above first control and part of the above second control and is performed in the power source frequency 2n-multiple selecting unit (64) and the multiplying unit (65). FIG. 14 illustrates a flow of processing for selecting a harmonic, which is part of the harmonic selecting and superimposing processing performed by the torque command modulation unit (60).

As illustrated in FIG. 14, the power source frequency 2n-multiple selecting unit (64) compares the input torque control amount with the predetermined amount ($A_1$*) (step S21). Note that the predetermined amount ($A_1$*) is the amplitude of the fundamental frequency component of the load torque.

If the torque control amount is greater than the predetermined amount ($A_1$*) (Yes in step S21), part of the above first control is performed. In this case, the power source frequency 2n-multiple selecting unit (64) determines that the vibration of the compressor is sufficiently reduced with the current torque control amount, and determines that a harmonic to be used to reduce the vibration of the compressor and the current peak is not to be selected (step S22). In this case, the power source frequency 2n-multiple selecting unit (64) outputs the second harmonic of the power source frequency, and the multiplying unit (65) multiplies the torque command value (T*), which is the output of the torque control superimposing unit (46), by the second harmonic of the power source frequency (applies the second harmonic of the power source frequency to the torque command value (T*)).

If the torque control amount is less than or equal to the predetermined amount ($A_1$*) (No in step S21), the second control is performed. Specifically, by using a third table (Ta3) illustrated in FIG. 15, the power source frequency 2n-multiple selecting unit (64) selects a type of a harmonic of the power source frequency in accordance with a peak reduction amount (Z) from the limit unit (64b) illustrated in FIG. 6 and outputs the harmonic (step S23). In this case, the power source frequency 2n-multiple selecting unit (64) outputs the selected harmonic component of the power source frequency, and the multiplying unit (65) multiplies the torque command value (T*), which is the output of the torque control superimposing unit (46), by the above harmonic component of the power source frequency (i.e., a component that is twice or more the power source frequency) (applies the harmonic component of the power source frequency to the torque command value (T*)).

Figure 15:
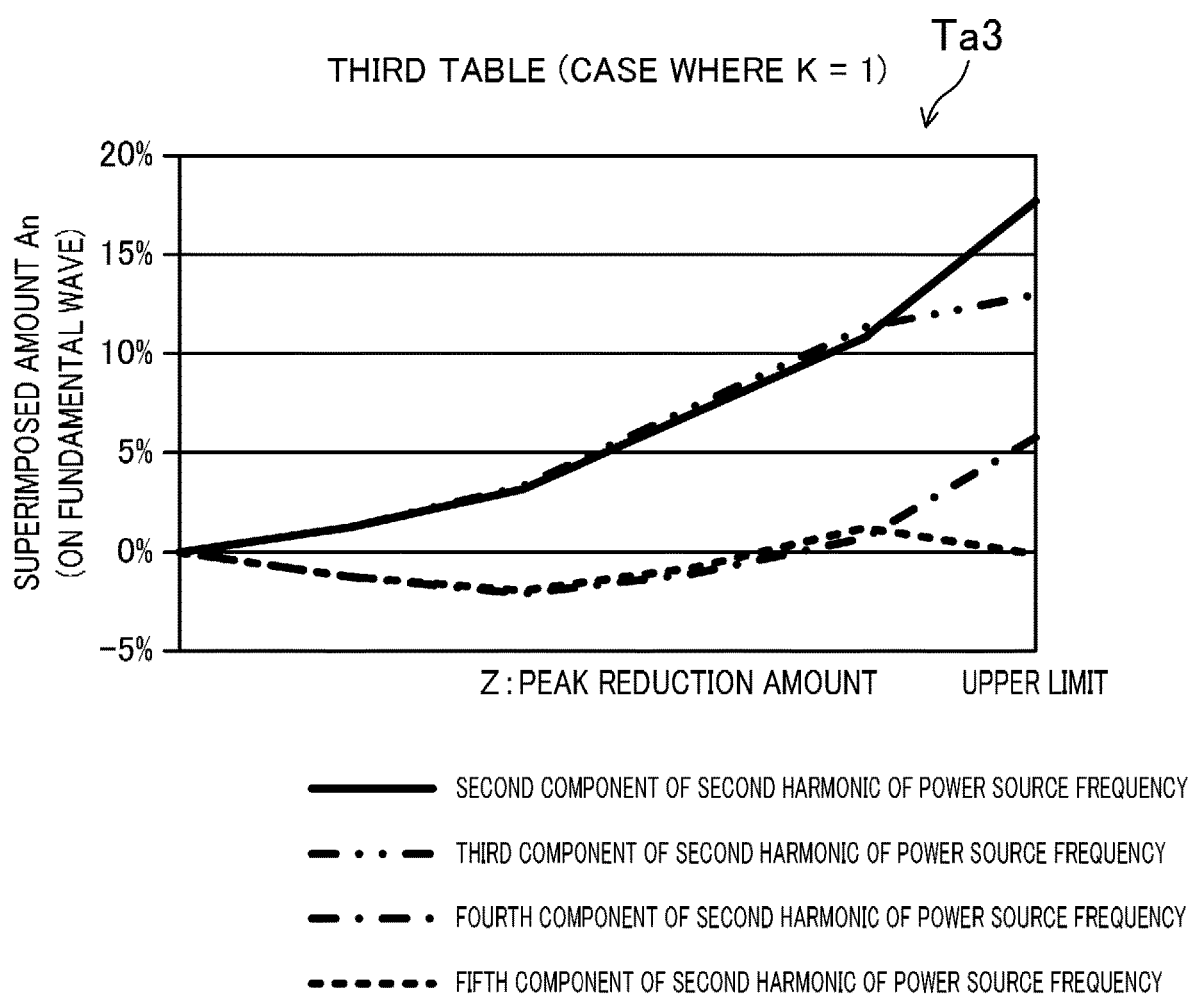
FIG. 15 is a conceptual diagram of a third table.

FIG. 15 is an example of the third table (Ta3) in a case where the coefficient K related to the second coefficient generating unit (62) is "1", in which the horizontal axis is the peak reduction amount (Z), and the vertical axis is superimposed amounts (An) of the harmonics on the fundamental frequency component of the load torque. The superimposed amount (An) of each of the second component to the fifth component of a frequency that is twice the power source frequency with respect to the peak reduction amount (Z) is illustrated. The "second component" in FIG. 15 corresponds to the second component of the second harmonic of the power source frequency, that is, the fourth harmonic of the power source frequency. The third component corresponds to the third component of the second harmonic of the power source frequency, that is, the sixth harmonic of the power source frequency. FIG. 15 is obtained by replacing the harmonic components of the fundamental frequency of the load torque in the first table (Ta1) in FIG. 9 with the harmonic components of a frequency that is twice the power source frequency, and the third table (Ta3) in a case where the coefficient K is "1" is substantially the same as the first table (Ta1) in FIG. 9 in a case where the torque control amount is 100%.

The third table (Ta3) is generated through the steps 1 to 5 as in the method for generating the first table (Ta1). In this case, in step 4, a phase within the range that can reduce the current peak is selected as the phase of a harmonic that is the second harmonic of the power source frequency. Specifically, when the phase with which the waveform of the second harmonic of the power source frequency becomes a positive value from a negative value is 0°, the phase with which the waveform of the second component of the second harmonic of the power source frequency (i.e., the fourth harmonic of the power source frequency) becomes a positive value from a negative value is determined to fall within, as in FIG. 10, a range from 0° to 180° in the phase of the fourth harmonic of the power source frequency, preferably the predetermined range A that is "greater than or equal to 45°+180m° (m: integer) and less than or equal to 135°+180m°". This value is represented as "greater than or equal to 22.5°+90m° (m: integer) and less than or equal to 67.5°+90m°" in the phase of the second harmonic of the power source frequency. The phase with which the waveform of the third component of the second harmonic of the power source frequency (i.e., the sixth harmonic of the power source frequency) becomes a positive value from a negative value is determined to fall within, as in FIG. 10, the predetermined range B that is "greater than or equal to −45°+180m° (m: integer) and less than or equal to 45°+180m°" in the phase of the sixth harmonic of the power source frequency. This value is represented as "greater than or equal to −15°+60m° (m: integer) and less than or equal to 15°+60m°" in the phase of the second harmonic of the power source frequency.

Also in the third table (Ta3), as the peak reduction amount (Z) approaches the upper limit in the third table (Ta3), the peak value of the output waveform of the torque command modulation unit (60) decreases. Thus, in the harmonic selecting and superimposing processing performed by the torque command modulation unit (60) using the third table (Ta3), a deviation between the peak of the output waveform of the torque command modulation unit (60) and the peak of the fundamental frequency component of the load torque is an element that suppresses the vibration of the compressor and that decreases the current peak.

<Operations of Control Unit>

—Flow of Operations of Control Unit Including Harmonic Selecting and Superimposing Processing—

Referring to FIG. 16, the flow of operations of the torque control unit (50), the torque control superimposing unit (46), and the torque command modulation unit (60) in the control unit (40) will be described.

FIG. 16 illustrates a case where the torque command modulation unit (60) performs harmonic selecting and superimposing processing and then the torque control unit (50) performs harmonic selecting and superimposing processing. In FIG. 16, the output waveform of the power source frequency 2n-multiple selecting unit (64) in the torque command modulation unit (60) is represented as g(t), and the output waveform of the torque control unit (50) (i.e., the waveform of a command value) is represented as f(t).

The output waveforms (f(t), g(t)) obtained when neither of the torque control unit (50) and the torque command modulation unit (60) performs harmonic selecting and superimposing processing are illustrated in the left graph in FIG. 16(a). In this state, the torque control superimposing unit (46) superimposes the average torque command (Tave*) on the output waveform (f(t)) of the torque control unit (50) illustrated by the broken line in the left graph (Tave*×f(t)), and the torque command modulation unit (60) superimposes the output waveform (g(t)) illustrated by the solid line in the left graph on the torque command (T*=Tave*×f(t)), which is the output of the torque control superimposing unit (46), and outputs it (Tave*×f(t)×g(t)). The right graph illustrates the waveform of the torque command modulation unit (60) (Tave*×f(t)×g(t)) obtained when the torque control amount is 100%.

The left graph in FIG. 16(b) illustrates the waveforms (f(t), g(t)) obtained when only the torque command modulation unit (60) performs harmonic selecting and superimposing processing. In this case, although the output waveform (f(t)) of the torque control unit (50) is identical with that in FIG. 16(a), the output waveform g(t) of the power source frequency 2n-multiple selecting unit (64) in the torque command modulation unit (60) is a waveform in which the peak is lower than that in FIG. 16(a). In this state, the output waveform output from the torque command modulation unit (60) (Tave*×f(t)×g(t)) is changed from FIG. 16(a) as illustrated in the right graph.

The left graph in FIG. 16(c) illustrates the output waveforms (f(t), g(t)) obtained when the torque control unit (50) further performs harmonic selecting and superimposing processing from the state in FIG. 16(b). In this case, the peak in the output waveform (f(t)) of the torque control unit (50) is lower than that in FIG. 16(b). However, the waveform g(t) of the power source frequency 2n-multiple selecting unit (64) in the torque command modulation unit (60) is identical with that in FIG. 16(b). In this state, the output waveform output from the torque command modulation unit (60) (Tave*×f(t)×g(t)) is further changed from FIG. 16(b) as illustrated in the right graph.

Although the torque control amount remains 100% in FIG. 16(a) to (c), the average torque (Tave) is increased as "1.00", "1.17", and "1.37".

—Comparison Between Torque Control According to Related Art and Torque Control According to First Embodiment—

Figure 17:
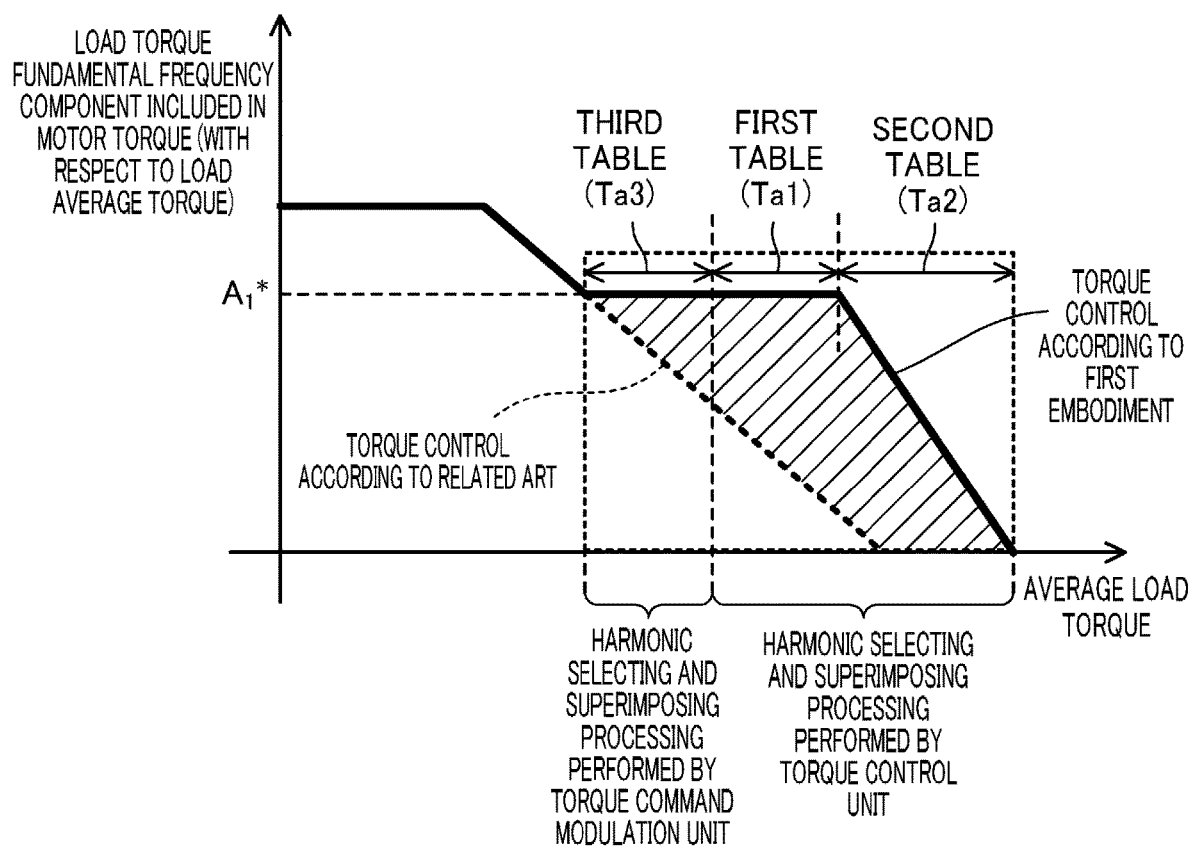
FIG. 17 illustrates effects of the harmonic selecting and superimposing processing according to the first embodiment.

FIG. 17 illustrates comparison between torque control according to the related art and torque control according to the first embodiment in which the horizontal axis is the average of the load torque and the vertical axis is the load torque fundamental frequency component included in the motor (5) with respect to the average of the load torque (the average torque).

As illustrated by a broken line in FIG. 17, in the torque control according to the related art, if the fundamental frequency component of the load torque (i.e., the torque control amount) included in the output torque (the motor torque) is less than the predetermined value ($A_1$*), the torque control amount is decreased in accordance with increase of the average of the output torque (specifically, the average torque), and thereby, the current peak is reduced.

In contrast, in the torque control according to the first embodiment, as illustrated by the solid line, if the fundamental frequency component of the load torque (i.e., the torque control amount) included in the output torque (the motor torque) is less than the predetermined value ($A_1$*), in accordance with increase of the average of the output torque (specifically, the average torque), the torque command modulation unit (60) performs harmonic selecting and superimposing processing using the third table (Ta3), the torque control unit (50) performs harmonic selecting and superimposing processing using the first table (Ta1), and the torque control unit (50) performs harmonic selecting and superimposing processing using the second table (Ta2) sequentially in this order.

According to the first embodiment as above, while the average of the output torque (specifically, the average torque) increases, when harmonic selecting and superimposing processing using the first and third tables (Ta1, Ta3) is performed, the ratio of the fundamental frequency component of the load torque included in the output torque is substantially constant.

That is, the oblique line portion between the broken line illustrating the torque control according to the related art and the solid line illustrating the torque control according to the first embodiment in FIG. 17 may be a portion where the vibration suppression amount of the compressor is increased in the first embodiment as compared with the torque control according to the related art.

Note that the solid line illustrating the torque control according to the first embodiment includes an inflection point where the table to be used is changed from the first table (Ta1) to the second table (Ta2). This inflection point corresponds to the upper limit of the peak reduction amount (Y) in the first table (Ta1) illustrated in FIG. 9.

Figure 18:
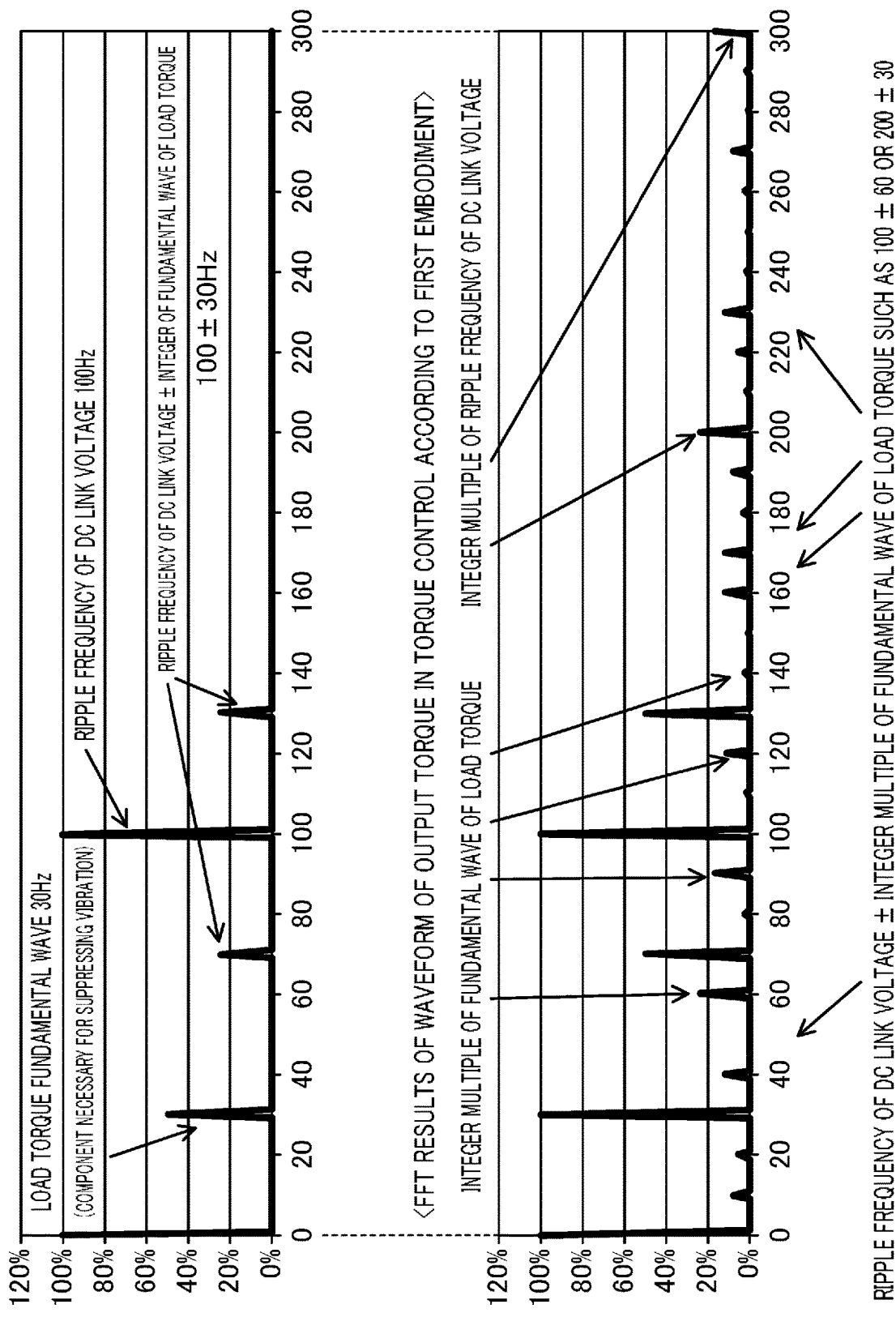
FIG. 18 illustrates a comparison between FFT results of a waveform of an output torque in torque control according to the related art and a waveform of an output torque in torque control according to the first embodiment.

FIG. 18 illustrates results of frequency analysis (FFT analysis) performed on each of the waveform of the output torque in the torque control according to the related art and the waveform of the output torque in the first embodiment. Note that in this frequency analysis, the peak of the output torque in the torque control according to the related art is equal to the peak of the output torque in the first embodiment, and the average torque is in a region illustrated in FIG. 17 where the first table (Ta1) is used.

In the frequency analysis results related to the torque control according to the related art, a spectrum representing the fundamental frequency component of the load torque "30 Hz", which is a component necessary for suppressing vibration, a spectrum representing a ripple frequency component "100 Hz" of the DC link voltage (Vdc), and spectra representing frequency components "130 Hz" and "70 Hz" obtained by adding and subtracting the fundamental frequency component of the load torque "30 Hz" to and from the ripple frequency "100 Hz" of the DC link voltage (Vdc) appear.

In contrast, in the frequency analysis results related to the first embodiment, spectra representing frequency components having a frequency that is an integer multiple of the fundamental frequency of the load torque, which are components necessary for suppressing vibration, spectra representing components having a frequency that is an integer multiple of the ripple frequency of the DC link voltage (Vdc) (corresponding to components having a frequency that is a 2n multiple (n: integer) of the power source frequency of the AC power source (6)), and spectra representing frequency components obtained by adding and subtracting a frequency that is an integer multiple of the fundamental frequency of the load torque to and from the integer multiple of the ripple frequency of the DC link voltage (Vdc) appear. That is, the number of spectra is larger than that in the torque control according to the related art.

Focusing on the fundamental frequency component of the load torque "30 Hz", the vibration suppressing component (vertical axis in FIG. 18) is increased in the first embodiment as compared with that in the related art. This illustrates that the harmonic selecting and superimposing processing according to the first embodiment contributes to reduction of the vibration of the compressor as compared with that in the torque control according to the related art. Thus, the motor torque is controlled so as to include frequency components obtained by adding and subtracting a frequency that is an integer multiple of the fundamental frequency of the load torque to and from the integer multiple of the ripple frequency of the DC link voltage (Vdc), and thereby the vibration suppressing component can be increased.

<Effects>

In the direct power conversion apparatus (10) according to the first embodiment, in order to suppress vibration, torque control for changing the output torque of the motor (5) is performed. In particular, in this torque control, first control and second control are performed (harmonic selecting and superimposing processing). In the first control, an output torque having a waveform including at least one of the fourth harmonic and the sixth harmonic of the power source frequency of the AC power source (6) is generated. In the second control, an output torque having a waveform including at least one of the second harmonic and the third harmonic of the fundamental frequency of the load torque of the motor (5) and the second harmonic of the power source frequency of the AC power source (6) are generated. Thus, the output toque can have frequency components that contributes to reduction of the vibration of the compressor in an increased amount as compared with that in the torque control according to the related art. This reduces the vibration of the compressor.

In the frequency analysis results of the output torque generated by the harmonic selecting and superimposing processing (the first control and the second control), as illustrated in FIG. 18, spectra representing frequency components obtained by adding and subtracting a 2n frequency of the power source frequency of the AC power source (6) to and from a frequency that is an integer multiple of the fundamental frequency of the load torque appear. According to FIG. 18, by controlling the torque so as to include the above frequency components, the vibration suppressing component of the fundamental frequency component of the load torque "30 Hz" is increased as compared with that in the related art, and the vibration of the compressor is more reliably suppressed.

In a case where the output torque includes the fourth harmonic of the power source frequency (i.e., the second component of the second harmonic of the power source frequency) in the first control, according to the third table (Ta3), the phase with which the waveform of the fourth harmonic of the power source frequency becomes a positive value from a negative value falls within a range that is greater than or equal to 22.5°+90m° (m: integer) and less than or equal to 67.5°+90m° in the phase of the second harmonic of the power source frequency. This can further reduce the peak of current flowing in the motor (5) in addition to reduction of the vibration of the compressor.

In a case where the output torque includes the sixth harmonic of the power source frequency (i.e., the third component of the second harmonic of the power source frequency) in the first control, according to the third table (Ta3), the phase with which the waveform of the sixth harmonic of the power source frequency becomes a positive value from a negative value falls within a range that is greater than or equal to −15°+60m° (m: integer) and less than or equal to 15°+60m° in the phase of the second harmonic of the power source frequency. This can further reduce the peak of current flowing in the motor (5) in addition to reduction of the vibration of the compressor.

In a case where the output torque includes the second harmonic of the fundamental frequency of the load torque in the second control, according to the first table (Ta1) and the second table (Ta2), the phase with which the waveform of the second harmonic of the fundamental frequency becomes a positive value from a negative value falls within a range that is greater than or equal to 22.5°+90m° (m: integer) and less than or equal to 67.5°+90m° in the phase of the fundamental frequency component of the load torque. This can further reduce the peak of current flowing in the motor (5) in addition to reduction of the vibration of the compressor.

In a case where the output torque includes the third harmonic of the fundamental frequency of the load torque in the second control, the phase with which the waveform of the third harmonic of the fundamental frequency becomes a positive value from a negative value falls within a range that is greater than or equal to −15°+60m° (m: integer) and less than or equal to 15°+60m° in the phase of the fundamental frequency component of the load torque. This can further reduce the peak of current flowing in the motor (5) in addition to reduction of the vibration of the compressor.

As illustrated in FIG. 18, while the average of the output torque is increased, by the above-described harmonic selecting and superimposing processing (the first control and the second control), the ratio of the fundamental frequency component of the load torque included in the output torque to the average of the output torque is substantially constant. Since the fundamental frequency component of the load torque is equivalent to the vibration suppressing component, the vibration suppressing component can be increased by the harmonic selecting and superimposing processing according to the first embodiment. Thus, the vibration of the compressor is reliably suppressed.

In addition, as illustrated in FIG. 1, the power conversion apparatus (10) includes the DC link unit (12) in which the DC link voltage (Vdc) has ripple. By the torque control performed by the power conversion apparatus (10), the above-described harmonic selecting and superimposing processing (the first control and the second control) is performed. Thus, the vibration of the compressor, a drive source of which is the motor (5) connected to the power conversion apparatus (10), can be reliably suppressed.

Second Embodiment

The first embodiment has described a method for reducing the vibration of the compressor and current peak through harmonic selecting and superimposing processing for actively superimposing a harmonic. A second embodiment will describe a case in which the harmonic selecting and superimposing processing performed by the torque control unit (50) and the harmonic selecting and superimposing processing performed by the torque command modulation unit (60) described in the first embodiment are performed as a result and at the same time by actively controlling the torque peak to be constant.

The power conversion apparatus (10) according to the second embodiment has substantially the same configuration as that in FIG. 1, but part of the internal configuration of the control unit (40) is different from that in the first embodiment.

<Configuration of Control Unit>

Figure 19:
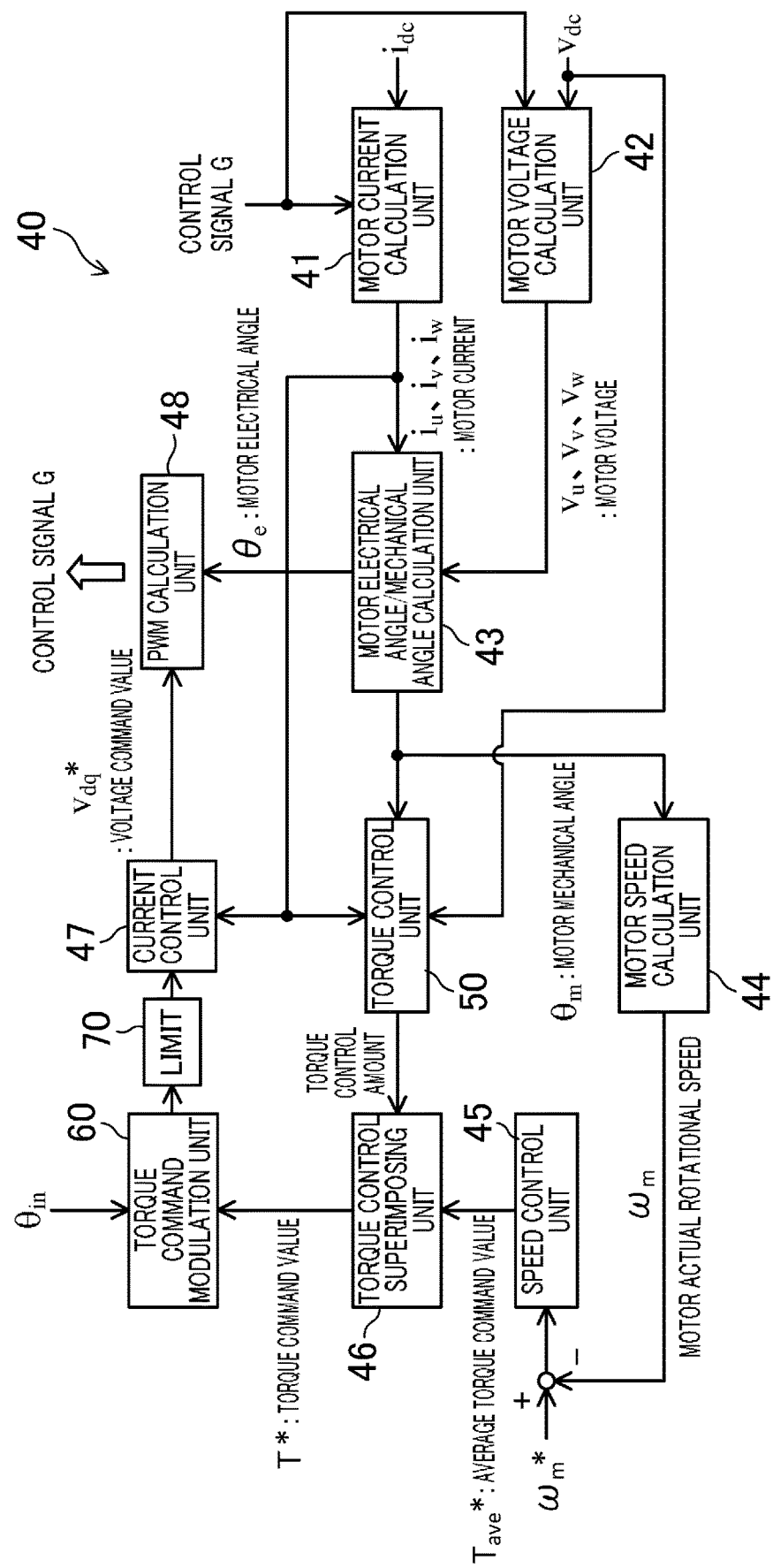
FIG. 19 is a block diagram illustrating details of a control unit according to a second embodiment.

FIG. 19 illustrates details of the control unit (40) according to the second embodiment. The control unit (40) according to the second embodiment further includes a limit unit (70) in addition to the configuration of the control unit (40) according to the first embodiment described with reference to FIG. 2. In FIG. 19, the same configuration as that of the control unit (40) according to the first embodiment is denoted by the same reference numeral.

<Torque Control Unit>

Although not illustrated, the torque control unit (50) according to the second embodiment does not include the load torque fundamental wave integer-multiple superimposing unit (56) from FIG. 3. Accordingly, the waveform generated on the basis of the torque control amount calculated by the torque control amount adjusting unit (55) is input to the torque control superimposing unit (46) as an output of the torque control unit (50).

<Torque Command Modulation Unit>

Although not illustrated, the torque command modulation unit (60) according to the second embodiment does not include the peak holding unit (63) and the power source frequency 2n-multiple selecting unit (64) from FIG. 5. Accordingly, when the coefficient generating units (61, 62) calculate K-multiple of the square of the sine wave $\sin \theta$ in from the phase ($\theta$ in) of the power source voltage, the multiplying unit (65) multiplies the calculation result by the torque command value (T*), and the multiplication result is output to the limit unit (70) as an output of the torque command modulation unit (60).

<Limit Unit>

On the basis of the above multiplication result output from the torque command modulation unit (60), the limit unit (70) performs processing for clipping the torque peak for each rotation of the motor (5) to be substantially constant. By this processing, as in the first embodiment, the waveform of the output torque includes the fundamental frequency component of the load torque and at least one of the fourth harmonic and the sixth harmonic of the power source frequency and includes at least one of the second harmonic and the third harmonic of the fundamental frequency of the load torque of the motor (5) and the second harmonic of the power source frequency of the AC power source (6).

As illustrated in FIG. 19, the control unit (40) performs feedback control from the input side of the torque control unit (50) to the input side of the speed control unit (45) using the actual motor mechanical angle ($\theta$m), motor actual rotational speed ($\omega$m), and the like. Thus, the result of the clipping processing performed by the limit unit (70) is reflected in the feedback control, and the feedback control adjusts the average torque and the torque control amount. Even when the clipping processing is performed, the load torque fundamental frequency component (i.e., the vibration suppressing component) included in the output torque of the motor (5) is not reduced.

<Operations of Control Unit>

As illustrated in FIG. 20, in a case where the fundamental frequency component of the load torque (i.e., the torque control amount) is greater than the lower limit ($A_1$*), the torque control unit (50) decreases the torque control amount in accordance with increase of the average of the load torque (the average torque), and thereby, the current peak is reduced.

If the torque control amount becomes less than or equal to the lower limit ($A_1$*), the limit unit (70) performs the above clipping processing. Thus, in a part where the torque control amount is less than or equal to the lower limit ($A_1$*), while the average of the output torque (specifically, the average torque) increases, the ratio of the fundamental frequency component of the load torque included in the output torque is substantially constant from point p1 to point p3 in the graph in FIG. 20.

As illustrated in the left graph in FIG. 20(*a*), the output waveform (f(t)) of the torque control unit (50) at point p1 and the waveform (g'(t)) to be multiplied by the torque command value (T*) in the torque command modulation unit (60) are sine waves having different frequencies but having the same amplitude. In this case, as illustrated in the right graph in FIG. 20(a), the output waveform output from the torque command modulation unit (60) (Tave*×f(t)×g'*(t)) is a waveform in which the peak is suppressed to be lower than or equal to the torque upper limit by the limit unit (70). Note that in the right graph in FIG. 20(a), the average torque (Tave) is "1.0", and the torque control amount is "100%".

As illustrated in the left graph in FIG. 20(b), the waveform (g'(t)) at point p2 is identical with the output waveform (g'(t)) at point p1, but the waveform (f(t)) has a larger amplitude than the output waveform (f(t)) at point p1. As an example, FIG. 20 illustrates a case in which, if the amplitude of the output waveform (f(t)) in FIG. 20(a) is set to 100%, the amplitude of the output waveform (f(t)) in FIG. 20(b) is increased to about 119%. In this case, as illustrated in the right graph in FIG. 20(b), although the output waveform output from the torque command modulation unit (60) (Tave*×f(t)×g'(t)) is generally increased as compared with the right graph in FIG. 20(a), the torque peak does not exceed the torque upper limit as a result of the clipping processing in the limit unit (70). Thus, while the torque control amount remains "100%", the average torque (Tave) is increased to "1.5".

<Effects>

In addition to the same effects as those in the first embodiment, the second embodiment further produces the following effects.

In the second embodiment, the limit unit (70) performs processing for clipping the torque peak for each rotation of the motor (5) to be substantially constant. By this clipping processing, the harmonic selecting and superimposing processing (the first control and the second control) described in the first embodiment is substantially performed. Thus, the output torque includes a harmonic that contributes to reduction of the vibration of the compressor. This reduces the vibration of the compressor.

OTHER EMBODIMENTS

Although the above first and second embodiments have illustrated a case where the power conversion apparatus (10) is a capacitor-less inverter, the power conversion apparatus (10) may be a matrix converter.

Although the above first and second embodiments have illustrated a case where each of the motor currents (iu, iv, iw), the motor voltages (Vu, Vv, Vw), and the motor mechanical angle (θm) is obtained through calculation, these may be directly detected. For example, the motor currents (iu, iv, iw) may be detected by a current sensor attached to a harness of each phase connecting the inverter circuit (13) and the motor (5), and the motor mechanical angle (θm) may be detected by an encoder attached to the motor (5).

Although FIG. 16 according to the first embodiment illustrates a case where the harmonic selecting and superimposing processing is performed by the torque command modulation unit (60) and then by the torque control unit (50), the harmonic selecting and superimposing processing may be performed by the torque control unit (50) and then by the torque command modulation unit (60).

The methods for generating the tables (Ta1 to Ta3) illustrated in the first embodiment are examples. The tables (Ta1 to Ta3) may be generated by other methods.

Although the first and second embodiments have illustrated a case where both the first control and the second control are performed, either of the first control and the second control may be performed.

The embodiments and modifications have described above. However, it is to be understood that forms or details may be variously changed without departing from the spirit and scope of the claims. In addition, the above embodiments and modifications may be combined or replaced as appropriate without impairing the functionality covered by the present disclosure.

INDUSTRIAL APPLICABILITY

As described above, the present disclosure is useful for a power conversion apparatus.

EXPLANATION OF REFERENCE 5 motor
6 AC power source
11 converter circuit
12 DC link unit
13 inverter circuit (converting unit)
40 control unit

The invention claimed is:

1. A direct power conversion apparatus comprising:
a converting unit that includes a plurality of switching elements and that converts an AC power supplied from a single-phase AC power source to a three-phase AC power at a predetermined frequency and supplies the three-phase AC power to a motor a load torque of which periodically fluctuates; and
a control unit that controls switching operations of the switching elements,
wherein the control unit performs at least one of first control and second control,
the first control being control for generating an output torque of the motor having a waveform including
a fundamental frequency component of the load torque a fundamental frequency of which is a frequency in accordance with a fluctuation period of the load torque and
at least one of a fourth harmonic and a sixth harmonic of a power source frequency of the AC power source,
the second control being control for generating the output torque having a waveform including
at least one of a second harmonic and a third harmonic of the fundamental frequency of the load torque and
a second harmonic of the power source frequency of the AC power source.

2. The power conversion apparatus according to claim 1, wherein, in frequency analysis results of the output torque generated by at least one of the first control and the second control, spectra representing frequency components obtained by adding and subtracting a 2n multiple (n: integer) of the power source frequency of the AC power source to and from a frequency that is an integer multiple of the fundamental frequency of the load torque appear.

3. The power conversion apparatus according to claim 1, wherein, in a case where the output torque includes the fourth harmonic of the power source frequency in the first control, when a phase with which a waveform of the second harmonic of the power source frequency included in the output torque becomes a positive value from a negative value is 0° in a phase of the second harmonic of the power source frequency, a phase with which a waveform of the fourth harmonic of the power source frequency becomes a positive value from a negative value falls within a range that is greater than or equal to 22.5°+90m° (m: integer) and less than or equal to 67.5°+90m° in the phase of the second harmonic of the power source frequency.

4. The power conversion apparatus according to claim 1, wherein, in a case where the output torque includes the sixth harmonic of the power source frequency in the first control, when a phase with which a waveform of the second harmonic of the power source frequency included in the output torque becomes a positive value from a negative value is 0° in a phase of the second harmonic of the power source frequency, a phase with which a waveform of the sixth harmonic of the power source frequency becomes a positive value from a negative value falls within a range that is greater than or equal to −15°+60m° (m: integer) and less than or equal to 15°+60m° in the phase of the second harmonic of the power source frequency.

5. The power conversion apparatus according to claim 1, wherein, in a case where the output torque includes the second harmonic of the fundamental frequency of the load torque in the second control, when a phase with which a waveform of the fundamental wave of the load torque included in the output torque becomes a positive value from a negative value is 0° in a phase of the fundamental frequency component of the load torque, a phase with which a waveform of the second harmonic of the fundamental frequency becomes a positive value from a negative value falls within a range that is greater than or equal to 22.5°+90m° (m: integer) and less than or equal to 67.5°+90m° in the phase of the fundamental frequency component of the load torque.

6. The power conversion apparatus according to claim 1, wherein, in a case where the output torque includes the third harmonic of the fundamental frequency of the load torque in the second control, when a phase with which a waveform of the fundamental wave of the load torque included in the output torque becomes a positive value from a negative value is 0° in a phase of the fundamental frequency component of the load torque, a phase with which a waveform of the third harmonic of the fundamental frequency becomes a positive value from a negative value falls within a range that is greater than or equal to −15°+60m° (m: integer) and less than or equal to 15°+60m° in the phase of the fundamental frequency component of the load torque.

7. The power conversion apparatus according to claim 1, wherein, while an average of the output torque increases, a ratio of the fundamental frequency component of the load torque included in the output torque to the average of the output torque is substantially constant.

8. The power conversion apparatus according to claim 1, wherein the control unit performs at least one of the first control and the second control by clipping a torque peak for each rotation of the motor to be substantially constant.

9. The power conversion apparatus according to claim 1, further comprising:
a converter circuit that rectifies a power source voltage in the AC power of the AC power source; and
a DC link unit that includes a capacitor connected in parallel to an output of the converter circuit and that outputs a DC voltage having ripple,
wherein the converting unit is an inverter circuit that converts an output of the DC link unit into the three-phrase AC power by performing switching operations of the switching elements.

\* \* \* \* \*